United States Patent [19]

Massa

[11] Patent Number: 5,422,934
[45] Date of Patent: Jun. 6, 1995

[54] CORDLESS RANGE EXTENSION ACCESSORY APPARATUS FOR RADIO TELEPHONES

[75] Inventor: Massimo Massa, 1637 Orchard Dr., Suite D, Placentia, Calif. 92670

[73] Assignees: Cellstar, Pacific Cellstar, Inc., Irvine, Calif.; Massimo Massa

[21] Appl. No.: 62,577

[22] Filed: May 17, 1993

[51] Int. Cl.⁶ .......................................... H04M 11/00
[52] U.S. Cl. ....................................... 379/61; 379/58; 455/11.1; 455/20
[58] Field of Search .................. 455/11.1, 127, 99, 20, 455/89; 379/61, 58

[56] References Cited

U.S. PATENT DOCUMENTS

| | | | |
|---|---|---|---|
| 4,850,006 | 7/1989 | Sasaki et al. | 379/58 |
| 5,044,010 | 8/1991 | Frenkiel et al. | 379/61 |
| 5,276,918 | 1/1994 | Cornforth et al. | 455/89 |

Primary Examiner—Curtis Kuntz
Assistant Examiner—Michael B. Chernoff
Attorney, Agent, or Firm—William L. Chapin

[57] ABSTRACT

An accessory apparatus for mobile radio telephones, particularly those used in cellular networks, permits utilization of the full communication range capability of a vehicle-mounted cellular radio telephone by a cordless portable handset remote from the vehicle. The apparatus includes a plug-in adapter unit located in a vehicle and interconnected between the existing handset and transceiver of the vehicle-mounted radio telephone. The adapter unit includes a first, resident, down-link transceiver operating at radio frequencies outside of the cellular frequency band, and adapted to receive demodulated audio and/or data signals from the resident cellular transceiver, and retransmit the signals via a low-power modulated down-link RF carrier signal to a portable remote cordless handset/transceiver. The cordless handset has a keypad, speaker, microphone and transceiver which receives down-link transmissions from the adapter unit transceiver, and transmits voice or data signals via a low-power up-link carrier signal to the adapter unit transceiver, which demodulates the information signals from the up-link carrier signal, and conveys them to the existing radio telephone transceiver for transmission at high power to the cellular network.

14 Claims, 19 Drawing Sheets

CORDLESS RANGE EXTENSION ACCESSORY APPARATUS FOR RADIO TELEPHONES

BACKGROUND OF THE INVENTION

A. Field of the Invention

This invention relates to communication systems and apparatus, specifically, mobile radio telephones. More particularly, the invention relates to methods and apparatus for increasing the communication range of small, portable radio telephones.

B. Description of Background Art

Radio telephones permitting two-way voice communications are being used in increasing numbers in automobiles. The use of such mobile radio telephones, or "car phones", has accelerated with the installation of cellular communication networks in metropolitan areas. Cellular networks consist of a plurality of interconnected fixed transceivers. When an automobile equipped with a "cellular" radio telephone moves away from a fixed transceiver of the cellular network, the power level of the signals received by both the fixed transceiver and the mobile transceiver drops. When the power level of the signal received by a fixed transceiver site in the cellular network falls below a threshold value required for reliable communication, automatic switching circuitry in the network transfers or "hands off" communication between the mobile radio telephone and that fixed site to another cellular site closer to the automobile.

Each transceiver site of a cellular network employs a relatively low power transmitter. However, the practical two-way communication range of each fixed cellular transceiver site overlaps with the ranges of adjacent fixed transceivers. Thus, a plurality of fixed cellular sites with overlapping transmission ranges is capable of covering a wide geographic area, providing effective communication with mobile transceivers moving through the area.

In a cellular network, a relatively large number of mobile radio telephones may carry on separate two-way conversations, each on a different radio frequency carrier channel. However, to minimize the possibility that a signal transmitted on one channel might spill over into adjacent channels and thereby interfere with communications in adjacent channels, the transmitter power of mobile radio telephones is usually limited to a value of about 3 watts.

Radio telephones commonly installed in motor vehicles include a transceiver and antenna, and a separate handset similar in appearance to a conventional telephone handset. The handset typically includes a microphone, speaker, numeric key pad and display. Most transceivers capable of transmitting 3-watt signals tend to be heavier and bulkier than the handset. Thus, maximum power transceivers are oftentimes fixed underneath a car seat or installed in the trunk of an automobile, and connected by a coaxial RF power cable to an antenna mounted externally on the automobile. For such transceivers, the handset is also connected to the transceiver by a multi-conductor cable, allowing the handset to be located within easy reach of the driver. Usually, both ends of the cable used to interconnect the handset to the transceiver are provided with multiple pin plugs to facilitate installation of the radio telephone, and to permit the handset to be unplugged and stowed out of sight when the vehicle is unoccupied.

The microphone and speaker contained in the handset of a radio telephone perform the same functions as the corresponding elements of a conventional telephone handset. Thus, the microphone converts sound signals such as speech into electrical signals, which are then coupled to the transceiver and used to modulate a radio frequency carrier signal conveyed to the antenna. Also, modulated radio frequency signals received by the antenna are demodulated within the transceiver, and conveyed to the handset speaker where they are converted into intelligible sounds.

The keypad in the handset is used to dial out numbers, to answer calls, turn system power on and off, and to select operating modes of the system. Numbers dialed and function modes are displayed on the handset display unit.

In addition to the radio telephones described above, which are intended for relatively permanent or long-term installation in a vehicle, another type of radio telephone referred to as a transportable radio telephone or cellular phone exists. Transportable radio telephones contain internal batteries which permit the units to be removed from a vehicle and operated away from the vehicle. Typically, the RF power output of transportable radio telephones lies in the range of about 1.2 watts to 3 watts. The batteries required to operate transportable radio telephones at the aforementioned power levels make the units relatively bulky and heavy.

A third class of radio telephones, called hand-held cellular phones, exists. Hand-held cellular telephones are much more compact and lighter in weight than transportable cellular telephones, making the hand-held units easier to carry and use. However, the small size of hand-held units restricts their RF power output, usually to a level of approximately 0.6 watts. Therefore, the range of a hand-held radio telephones is substantially less than that of vehicle-mounted or transportable radio telephones, which operate at the maximum allowed RF power level of 3 watts.

Besides having a limited range, hand-held radio telephones are usually costly to manufacture, owing to the higher degree of micro-miniaturization required in their construction, as compared to larger vehicle-mounted or transportable radio telephones.

In view of the weight and size disadvantages of transportable radio telephones, and the power output limitations and high cost of hand-held radio telephones, the present invention was conceived of.

OBJECTS OF THE INVENTION

An object of the present invention is to provide an accessory for mobile radio telephones of the type having a vehicle-mounted transceiver, the accessory allowing use of a portable auxiliary handset remote from the vehicle to interface with and utilize the transmission and reception functions of the vehicle-mounted transceiver.

Another object of the invention is to provide an accessory for mobile radio telephones that allows operation of a vehicle-mounted transceiver from a remote auxiliary handset.

Another object of the invention is to provide an accessory apparatus for mobile radio telephones that can be removably installed between the original handset and vehicle-mounted transceiver of the radio telephone, and provide operable interfacing between the transceiver and a remote auxiliary handset.

Another object of the invention is to provide an accessory apparatus for mobile radio telephones that interfaces between the handset and vehicle-mounted transceiver of the radio telephone, and allows remote emulation of the functions of the original handset.

Another object of the invention is to provide an accessory apparatus for mobile radio telephones that provides a cordless communication link between a remote auxiliary handset device and an interface device connected to a vehicle-mounted radio telephone.

Another object of the invention is to provide a cordless communication range extension apparatus that permits a small, low-power hand-held transceiver accessory to communicate with and command the transmission, reception and control functions of a higher power, vehicle-mounted radio telephone, thereby permitting the hand-held transceiver accessory to utilize the full transmission range of the higher power, vehicle-mounted transceiver.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an accessory apparatus for use with mobile radio telephones that extends the operable range of a vehicle-mounted radio telephone, allowing the latter to be operated from some distance away from the vehicle.

The accessory apparatus according to the present invention includes an adapter unit that is adapted to be connected between the existing handset and cellular frequency-band transceiver of the vehicle-mounted radio telephone. The adapter unit includes a first, "resident" or base, low power radio transceiver operating on a "link" radio-frequency transmitted signal having a frequency different than those of the cellular frequency-band, and control logic contained in an interface module. A second, portable low power, hand-held cordless remote radio transceiver and integral handset operating on the link frequency comprises the second major component of the accessory apparatus according to the present invention.

The cordless handset according to the present invention has an integral link transceiver which generates DTMF (Dual-Tone, Multi-Frequency) command signals in response to actuation of selected buttons on a keypad integral with the handset. DTMF command signals thus generated modulate an RF up-link carrier signal transmitted by the hand-held transceiver. The modulated up-link carrier signal is received by the resident or base link transceiver installed within a vehicle, which demodulates the signal and couples the DTMF command signals to an interface module connected between the link transceiver, and the existing vehicle transceiver and handset.

The interface module contains microprocessor controlled circuitry which converts the received DTMF signals to the proper digital format required by the vehicle radio telephone apparatus, thereby configuring the latter apparatus into the desired dial-out or off-hook status. With the vehicle transceiver configured into a selected operational mode by commands from the portable handset; voice, modem or telefax signals coupled into the portable handset are transmitted at low power over the link frequency channel to the resident transceiver, routed through the interface module to the mobile transceiver, and re-transmitted at higher power on the cellular frequency by the mobile transceiver. Conversely, signals received by the cellular transceiver are routed through the interface module to the resident link transceiver, and re-transmitted or "down-linked" to the portable handset transceiver. Thus, the accessory apparatus according to the present invention allows a small, light weight, low power, cordless hand-held handset and integral transceiver to communicate with a cellular radio telephone network, with the full power and range capabilities of a vehicle-mounted, high power radio telephone.

DETAILED DESCRIPTION OF THE INVENTION

Figure 1:
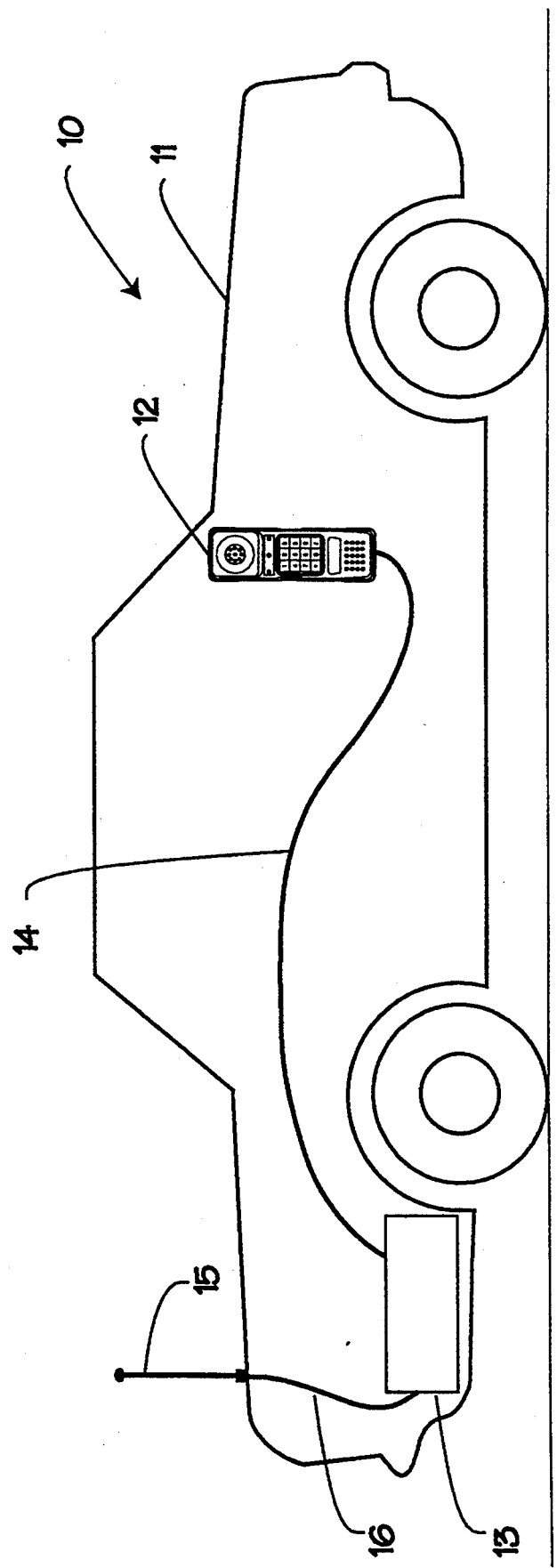
FIG. 1 is a partly pictorial block diagram of a prior art mobile radio telephone installed in a motor vehicle.

Referring now to FIGS. 2 through 10, a novel cordless range extension accessory apparatus for radio telephones according to the present invention is shown. FIG. 1 illustrates a typical prior art mobile radio telephone installation, of the type which the present invention is intended to be used with, to enhance the performance of the existing radio telephone, Referring now to FIG. 1, a typical prior art mobile radio telephone 10 is shown installed in a vehicle 11. As shown in FIG. 1, the typical mobile radio telephone includes a handset 12 connected to a transceiver 13 by a cable 14, and an external antenna 15 connected to the transceiver by a coaxial radio frequency (RF) power cable 16. Cable 14 is usually a multi-connector cable terminated at both ends by plugs adapted to be received by jacks on handset 12 and transceiver 13, respectively. This arrangement facilitates installation of transceiver 13, which is usually heavier and bulkier than handset 12, underneath a car seat or in the trunk of the car, as shown in FIG. 1.

Handset 12 includes the customary telephone microphone and speaker, and a keypad for dialing a selected telephone number. Usually, the keypad is of the type that generates DTMF (Dual-Tone, Multi-Frequency) signals, often referred to by the trade name "TOUCH-TONES." Typically, handset 12 also contains a display unit for displaying telephone numbers that have been dialed, and various other status data. Also, the handset may contain other switches and/or controls that may be used to re-dial a previously dialed number, mute outgoing voice transmission, etc. Mobile radio telephones usually operate in the frequency range of 825.030 to 889.980 MHZ, at a maximum transmitted power of about 3 watts.

Figure 2:
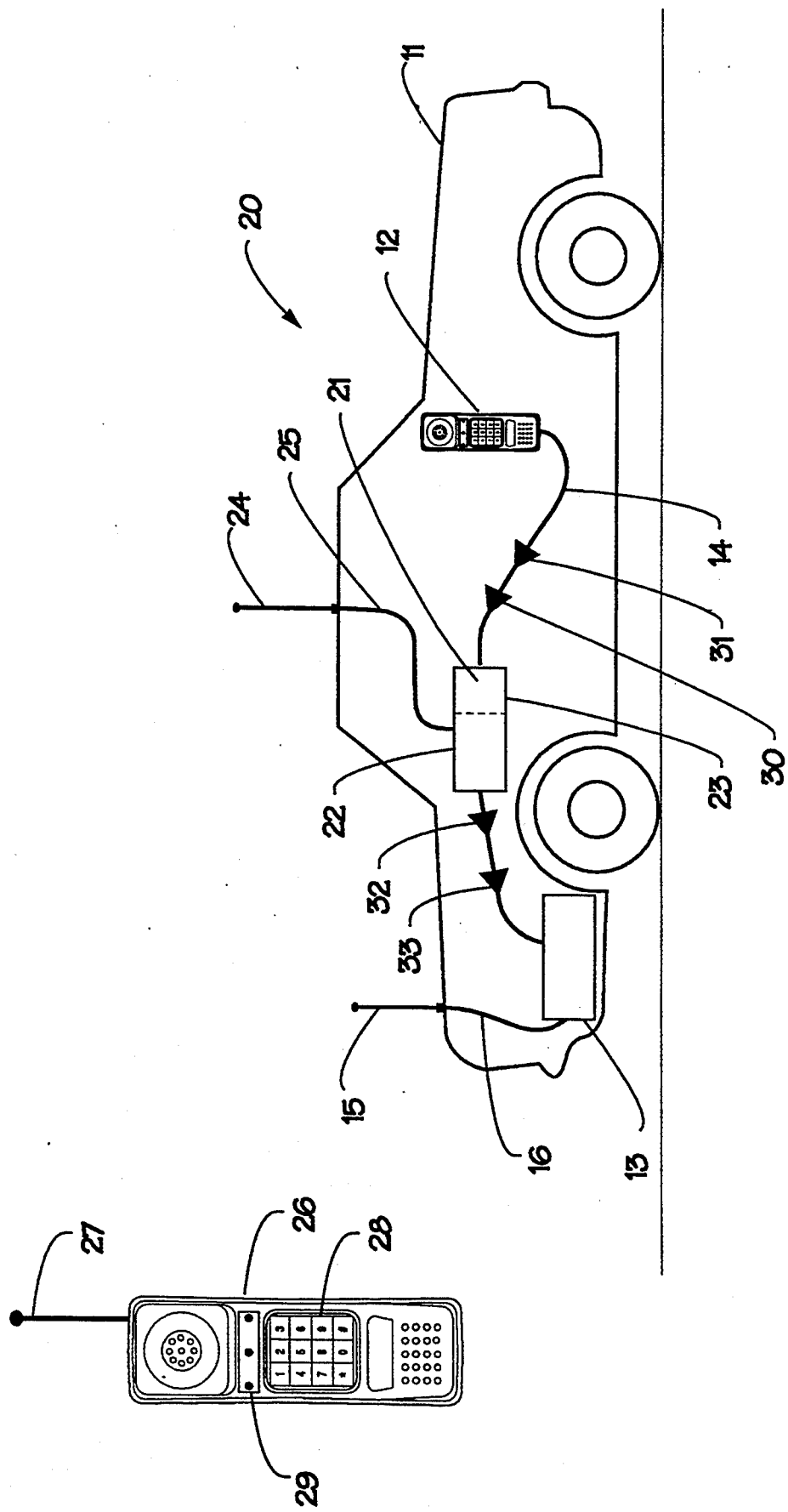
FIG. 2 is a partly pictorial block diagram of a mobile radio telephone installed in a motor vehicle, showing an adapter unit comprising the first of two major components of cordless range extension accessory apparatus according to the present invention operably interconnected to the mobile radio telephone, and showing a portable cordless handset unit comprising the second major component of the apparatus.

FIG. 2 is a simplified block diagram of a cordless range extension accessory apparatus 20 according to the present invention, showing the apparatus operably interconnected to a vehicle-mounted mobile radio telephone 10 of the type shown in FIG. 1.

As shown in FIG. 2, the range extension accessory apparatus 20 according to the present invention includes an interface module 21 connected to a resident low-power "link" radio transceiver 22. Preferably, interface module 21 and transceiver 22 are contained in a single modular package 23, which will be referred to as an adapter unit. Resident low power transceiver 22 operates at a frequency different from those of the cellular band utilized by mobile or main radio telephone transceiver 13. A suitable operating frequency for resident low power transceiver 22 is 49 MHZ or 902 to 928 MHZ, although other frequency bands could of course be used.

Low-power, resident link transceiver 22 is connected to an auxiliary antenna 24 by a coaxial RF power cable 25.

The cordless range extension accessory apparatus 20 according to the present invention includes a portable cordless handset/link transceiver 26 that is small enough to be conveniently held in a single hand, and carried in one's pocket. Handset 26 includes an antenna 27, a keypad 28, and preferably, a display 29. Portable link transceiver 26 and resident link transceiver operate at the same frequency.

The peak transmitted power of portable link transceiver 26 is preferably no more than about 0.13 milliwatts, thus allowing the transceiver and its power supply batteries to be quite small and light weight. Although the resident link transmitter 22 need not be as small and low powered as the portable link transmitter to achieve the advantages of the present invention, I have found that a desirable transmitter power level for resident link transmitter 22 is about 0.13 milliwatts.

Interface module 21 of adapter unit 23 contains microprocessor controlled circuitry which allows operation of mobile radio telephone 10 by a remotely located portable link transceiver 26 having no wire connections to the mobile radio telephone. Desirably, interface unit 21 has a jack 30 adapted to receive the multi-connector plug 31 on the transceiver end of cable 14 of radio telephone 10. Also, interface unit 21 preferably has a plug 32 adapted to be inserted into jack 33 of mobile radio telephone transceiver 13.

An important function of interface module 21 is to emulate the protocol of signals emanating from the mobile radio telephone handset 12. DTMF control signals transmitted from portable handset/link transceiver 26 are converted by interface unit 21 to digital signals of the proper format to control the transmitter portion of mobile transceiver 13. Thus, interface unit 21 allows control signals entered via the key pad of portable handset/link transceiver 26 to place mobile radio telephone 10 in a selected operating mode. Also, interface module 21 allows telephone numbers entered via the keypad of portable handset/link transceiver 26, as well as voice or digital information, to be transmitted by the mobile transceiver 13. Interface module 21 also routes signals received by mobile transceiver 13 to the transmitter section of resident link transceiver 22, which in turn transmits those signals to portable handset/link transceiver 26. A more detailed description of the aforementioned functions, and other operational modes of the apparatus 20 may be best understood by referring to FIGS. 3 through 10.

Figure 3:
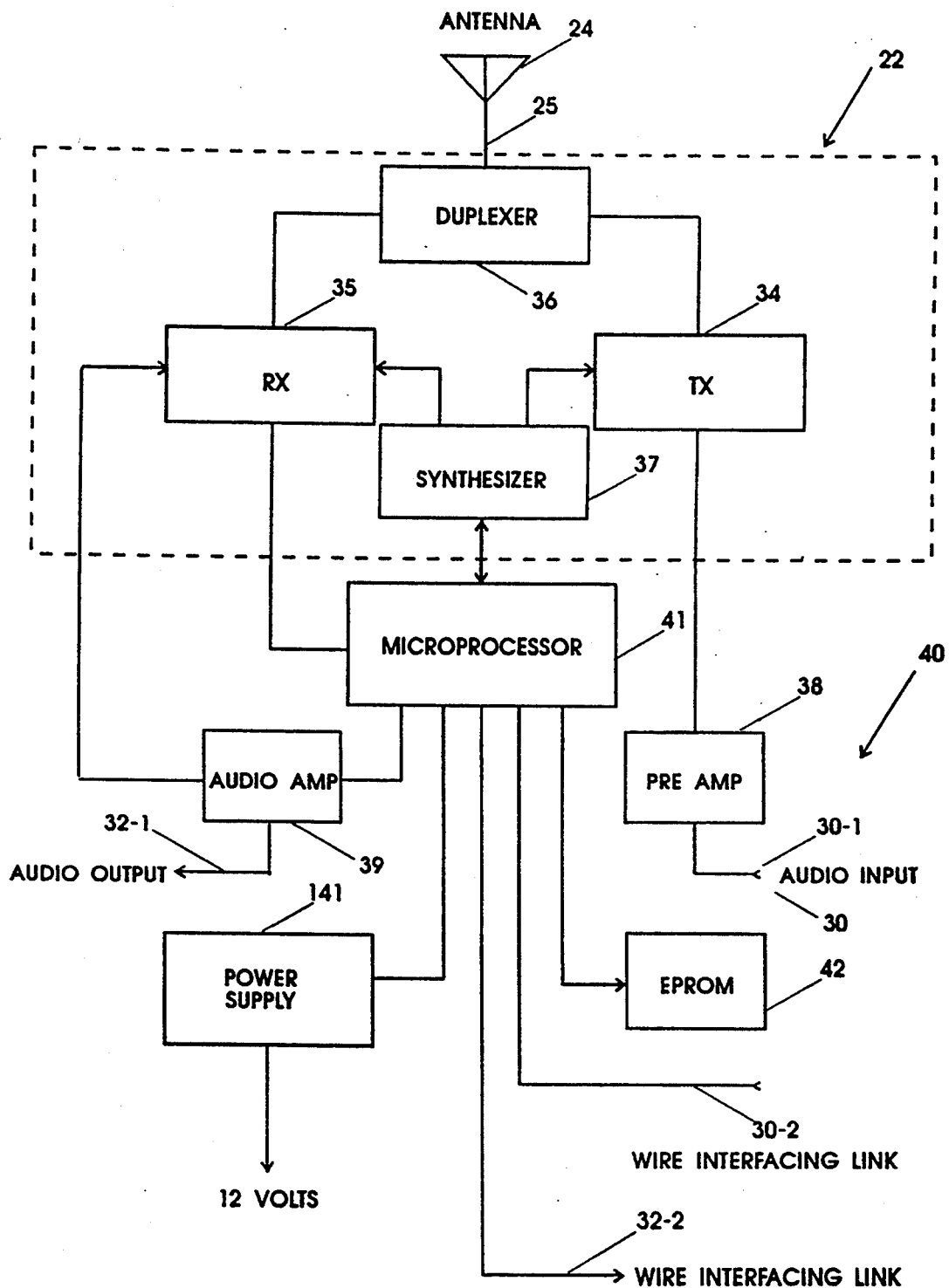
FIG. 3 is a more detailed block diagram of the adapter unit of FIG. 2.

Referring now primarily to FIG. 3, and also to FIG. 2, interface module 21 of adapter unit 23 may be seen to include a jack 30 having a connector 30-1 for receiving audio input signals from the microphone in the handset of an existing vehicle-mounted cellular radio telephone 12. Jack 30 of interface module 21 also includes a connector 30-2 for receiving command signals used to configure existing mobile transceiver 13 into desired operating modes.

Interface module 21 also includes a plug 32 for interconnecting adapter unit 23 to an existing cellular transceiver 13. Plug 32 includes a connector 32-1 for conveying audio signals to existing mobile transceiver 13, and a connector 32-2 for conveying command signals to the transceiver.

As shown in FIG. 3, adapter unit 23 also includes a radio transceiver 22 that operates at radio frequencies different from those used by existing mobile transceiver 13. Transceiver 22 includes an RF transmitter 34, and an RF receiver 35. The output port of transmitter 34 and input port of receiver 35 are connected to separate ports of a duplexer 36, the latter having an output port connected to a single antenna 24 by means of an RF power cable 25. The function of duplexer 36 is to permit transmitter 34 and receiver 35 to use the same antenna 24 while protecting the receiver from high transmitter power levels which might damage the receiver. Transceiver 22 also includes a frequency synthesizer 37 for producing an RF carrier signal for transmitter 34, and an RF beat or heterodyne frequency signal for receiver 35, which is of the superheterodyne type.

As shown in FIG. 3, adapter unit 23 also includes a pre-amplifier 38 for amplifying audio input signals on audio input terminal 30-1 to a level sufficient to modulate at a desired percentage the RF carrier signal produced by transmitter 34. Adapter unit 23 also includes an audio amplifier 39 for amplifying demodulated audio signals from receiver 35 to a level sufficient to drive the earphone or loudspeaker of the existing cellular telephone handset 12.

Referring still to FIG. 3, it may be seen that adapter unit 23 includes a control unit 40. The function of control unit 40 is to control the operation of the various components of adapter unit 23. Control unit 40 includes a microprocessor 41, the operation of which is controlled in part by an electrically programmable read only memory (EPROM) 42. Under program control, microprocessor 41 processes digital data and status signals received from other components of adapter unit 23, and emits command signals which control the operation of transmitter 34, receiver 35, and other components of adapter unit 23. A detailed description of the functions of control unit 40 is given below.

Figure 4A:
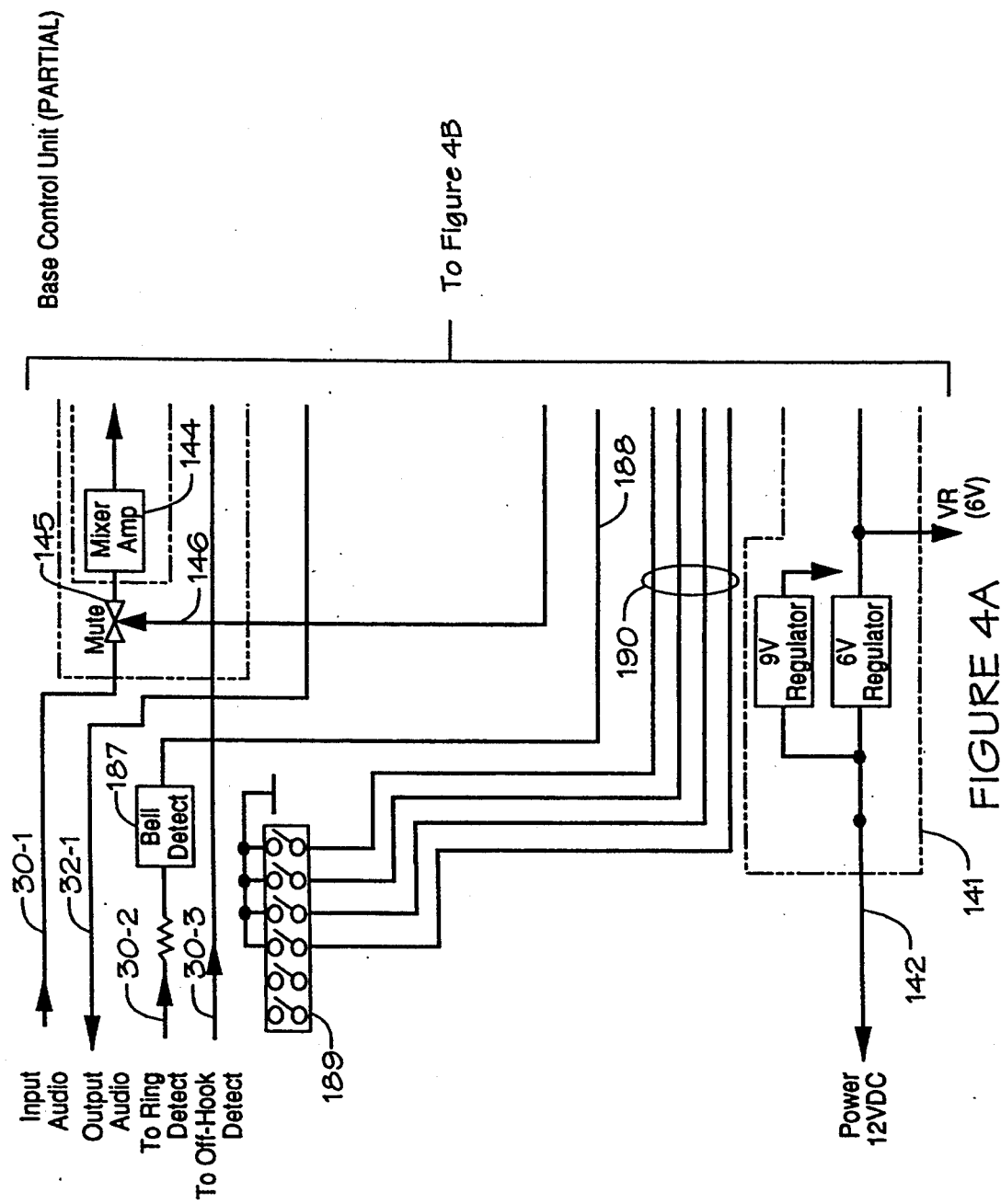
FIG. 4 is a partly schematic block diagram of an interface control module comprising part of the adapter unit of FIG. 3.
Figure 4B:
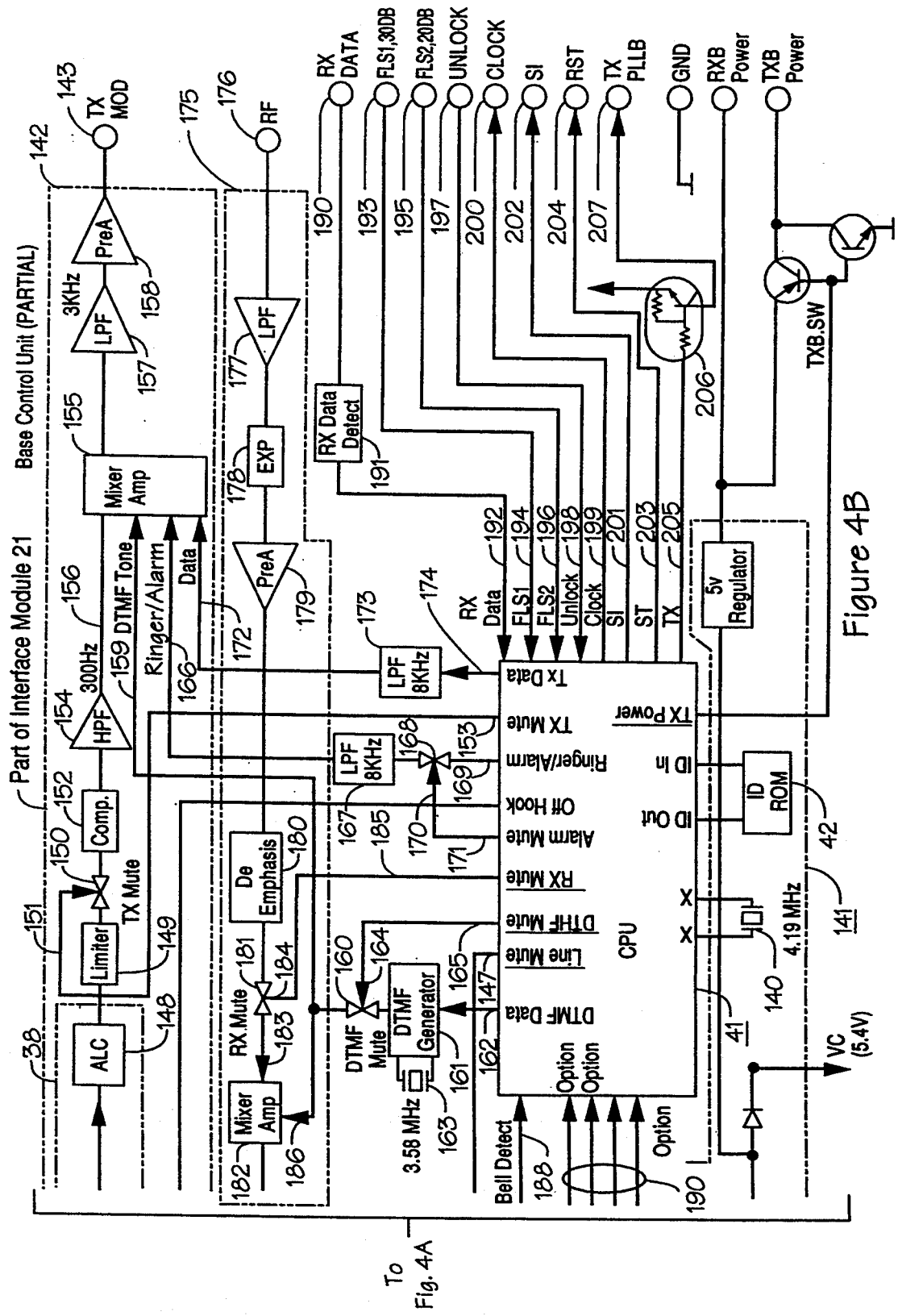
Figure 5:
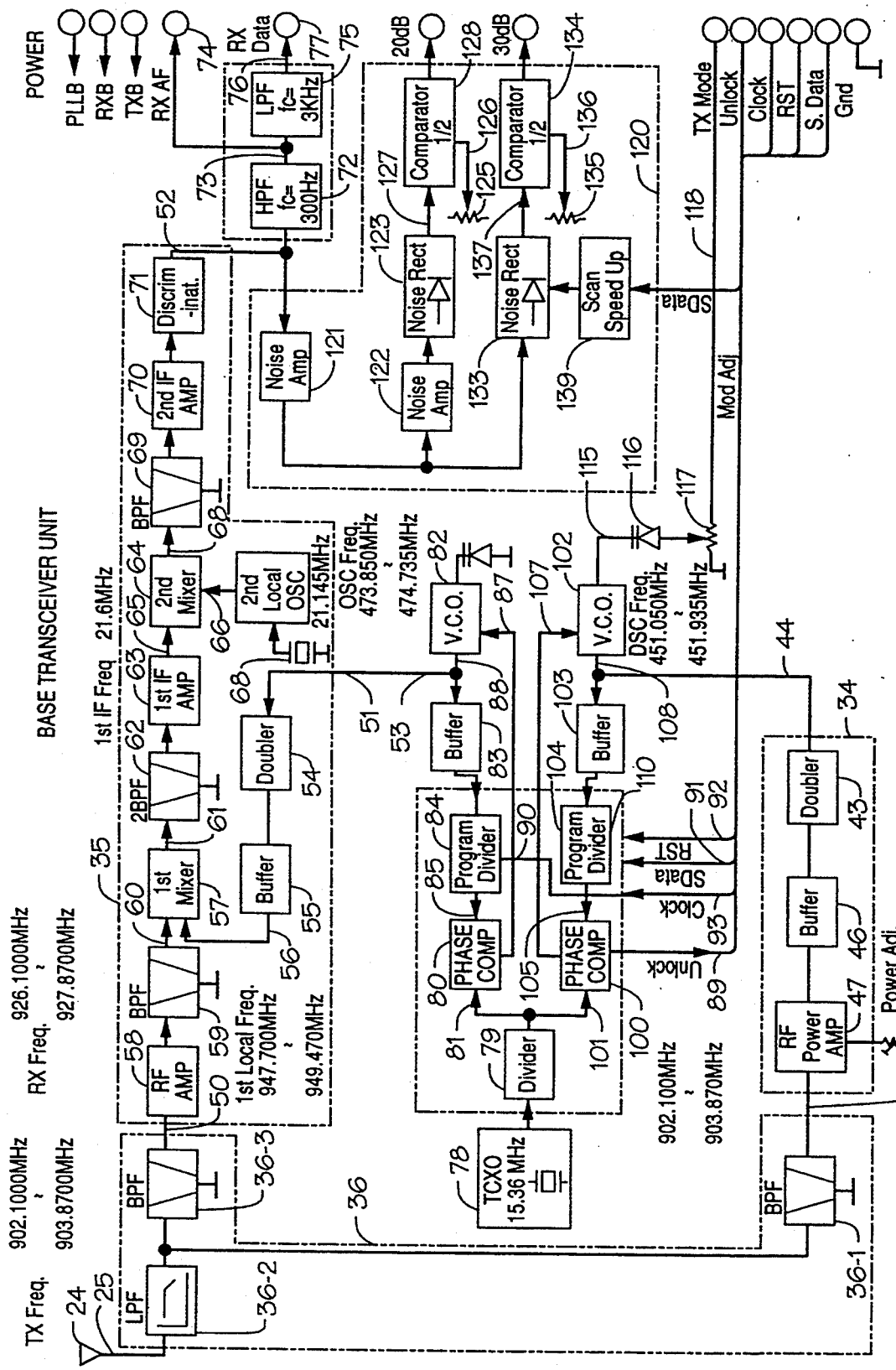
FIG. 5 is a partly schematic block diagram of a resident link transceiver module comprising another part of the adapter unit of FIG. 3.

FIGS. 4 and 5 illustrate in more detail the structure and function of control unit 40 and transceiver 22 of adapter unit 23.

Referring first to FIG. 5, transceiver 22 may be seen to include transmitter 34, receiver 35, duplexer 36 and frequency synthesizer 37. Transmitter 34 includes a frequency doubler 43 having an input port 44 connected to a first output port 45 of frequency synthesizer 37. The output port of frequency doubler 43 is coupled to the input port of a buffer amplifier 46, the output port of which is connected to the input port of an RF power amplifier 47. A potentiometer 48 connected to power amplifier 47 is used to adjust the output power level on output port 49 of the power amplifier.

As shown in FIG. 5, transceiver 22 also includes a receiver 35. Receiver 35 is of the superheterodyne type, having a modulated RF signal input port 50, a beat or heterodyne frequency signal input port 51, and a demodulated signal output port 52. Heterodyne signal input port 51 of receiver 35 is connected to a second output port 53 of frequency synthesizer 37, and to a series combination of a frequency doubler 54 and buffer amplifier 55, the output port of which is connected to the first input port 56 of a first mixer 57.

Duplexer 36 prevents RF power signals on output port 49 of transmitter 34 from appearing on input port 50 of receiver 35. To perform this function, duplexer 36 includes a first, transmitter bandpass filter 36-1 connected in series with output port 49 of RF transmitter power amplifier 47 and an antenna low pass filter 36-2, the output terminal of which is connected through power cable 25 to antenna 24. Duplexer 36 also includes a second, receiver bandpass filter 36-3 having an input terminal connected to the junction node of transmitter bandpass filter 36-1. The pass bands of transmitter bandpass filter 36-1 and receiver bandpass filter 36-3 are non-overlapping, thus preventing transmitted RF energy from passing through the receiver bandpass filter to input port 50 of receiver 35. For example, receiver bandpass filter 36-3 could have a pass band extending between 902.100 mhz and 903.8700 mhz, while transmitter bandpass filter 36-1 could have a pass band extending between 926.100 mhz and 927.8700 mhz.

Receiver 35 includes an RF amplifier 58 having an input terminal connected to modulated RF signal input port 50 of the receiver, and an output port connected to a first receiver RF bandpass filter 59. The output port of first RF bandpass filter 59 is coupled to a second input port 60 of first mixer 57, which produces at its output terminal, a first intermediate frequency (IF) signal having a center frequency equal to the difference in frequencies between the modulated RF signal at input terminal 60, and a local heterodyne signal at input terminal 56. The first IF signal at output terminal 61 of first mixer 57 is conducted through a first IF bandpass filter 62 and first IF amplifier 63 to a first input port 65 of a second mixer 64. Second mixer 64 has a second input port 66 connected to the output terminal of a local oscillator 67, the frequency of which is controlled by a crystal 68. Second mixer 64 produces at its output terminal 68 a second intermediate frequency (IF) signal having a center frequency equal to the difference in frequencies between the first IF frequency and the local oscillator frequency. The second IF signal at the output terminal 68 of second mixer 67 is conducted through a second IF bandpass filter 69 and a second IF amplifier 70 tQ a discriminator 71. Discriminator 71 demodulates audio frequency information signals from the second IF signal, producing at output terminal 72 of the discriminator the demodulated information signals. The demodulated information signals are conducted to a high pass audio filter 72 having a lower cutoff frequency $F_c$ of about 300 Hz. Output terminal 73 of high pass filter 72 is connected to an interface terminal 74 of transceiver 22, and it further processed and conveyed to an earphone or speaker as will be described below. Output terminal 73 of high pass filter 73 is also connected to the input terminal of a low pass audio filter 75 having an upper cutoff frequency of about 3 Khz. The output terminal 76 of low pass audio filter 75 is connected to an interface terminal 77, and is further processed and conveyed to digital decoding circuitry for decoding data signals contained in a received signal, as will be described in greater detail below.

Referring still to FIG. 5, frequency synthesizer 37 will now be described in greater detail. As shown in FIG. 5, frequency synthesizer 37 includes a temperature controlled crystal oscillator 78, the output terminal of which is connected to a frequency divider 79. The lower frequency reference signal at the output terminal of frequency divider 79 is used as a reference frequency signal for two independent phased locked loops (PLL); a first PLL 37-1 for receiver 35 and a second PLL 37-2 for transmitter 34. First phase locked loop 37-1 produces a heterodyne signal for receiver 35 and includes a phase comparator 80 having a reference input terminal 81. Also included in the first receiver phase locked loop is a first voltage controlled oscillator (VCO) 82. The output terminal of first VCO 82 is amplified by a first VCO buffer amplifier 83, divided in frequency by a first programmable divider 84, and inputted to a second input terminal 85 of phase comparator 80. Output terminal 86 of phase comparator 80 is connected to a control input terminal 87 of first VCO 82. Phase comparator 80 produces at its output terminal 86 an error signal proportional to the difference in frequency between a signal at reference input terminal 81 of the phase comparator and the divided-frequency VCO output signal. When inputted to control input terminal 87 of VCO 82, the error signal causes the frequency of the VCO to vary in a direction that reduces the error signal to a minimum, thus causing the frequency of the receiver heterodyne signal at output terminal 88 of VCO 82 to be maintained at a precise multiple of the frequency of temperature controlled crystal oscillator 78.

Receiver PLL 37-1 includes means for detecting the existence of a phase lock loop error signal at the output of phase comparator 86 that is above a pre-determined threshold value for a pre-determined duration, thus indicating that the phase lock servo loop is in an unstable, hunting, or unlocked condition. The unlocked condition is outputted as a discrete status signal on output terminal 89 of digital synthesizer 37, and is used by control logic in a manner to be described later.

Programmable divider 84 of receiver PLL 37-1 has a data input port 90 connected to transceiver input port 91, labelled SD data. Digital data signals generated by the control unit in a manner to be described later are inputted to data input port 90 of programmable divider 84 to configure the divider to a desired division ratio, thus allowing the heterodyne signal generate by VCO 82 to frequency hop to a desired one of a plurality of frequencies. Frequency synthesizer 37 also has a reset input port 92 that permits resetting the various registers used in the frequency synthesizer, allowing the interruption of phase locks of both receiver PLL 37-1 and transmitter PLL 37-1 and entry of new division ratios for programmable divider 84, thus allowing both receiver 35 and transmitter 34 to be stepped to different operating frequencies. Frequency synthesizer 37-1 also has a clock input port 93 that conveys a clock signal generated by control unit 40 to the various registers of the frequency synthesizer, allowing synchronous loading of data into the registers.

Transmitter PLL 37-2 is substantially identical in structure and function to that of receiver PLL 37-1 just described. Thus, transmitter PLL 37-2 utilizes the same temperature controlled crystal oscillator 78 and divider 79. Transmitter PLL 37-2 has a phase comparator 100 having a first reference signal input terminal 101, a voltage controlled oscillator (VCO) 102 and associated output buffer amplifier 103, a programmable divider 104, a second variable input terminal 105 on phase comparator 100, an output terminal 106 of phase comparator 100, a control input terminal 107 on VCO 102, an output terminal 108 on VCO 102, and a data input port 110 on programmable divider 104, all identical in structure and function to the corresponding elements described above for receiver PLL 37-1. Transmitter VCO 102 has an additional active input terminal 115 that is connected to the wiper of a modulation adjustment potentiometer 117, the input terminal 118 of which is connected to a source of audio and digital modulation signals provided by control unit 40. These modulation signals are effective in modulating at audio frequencies the radio frequency carrier signal produced by VCO 102 appearing at output terminal 108 thereof. Percentage modulation of the carrier is controlled by potentiometer 117.

As shown in FIG. 5, transceiver 22 includes a noise detector functional block 120. Noise detector block 120 includes a first noise amplifier 121 connected to demodulated signal output terminal 52 of receiver 35. The output terminal of first noise amplifier 121 is connected to two parallel discrete noise level detector branches. First, 20-db. detector branch includes a second noise amplifier 122, first noise rectifier 123, and first comparator 124. When the average noise level of the demodulated signal at output terminal 52 of receiver 35 is 20-db. above a reference level, set by a first reference potentiometer 125 connected to a reference input 126 of first comparator 124, the rectified signal at an input terminal 127 of the first comparator causes a logic true level to appear at output terminal 128 of the first comparator. This logic level is utilized by control unit 40 in a manner to be described below.

Noise detector block 120 also includes a second, 30-db. branch that includes a second noise rectifier 133, and a second comparator 134 having a signal input terminal 137, a reference input terminal 136 connected to a second reference potentiometer 135, and an output terminal 138. When average noise 30-db. above a reference level set by potentiometer 135 is detected by second comparator 134, a logic true level appears at output terminal 138 of the second comparator.

Referring now primarily to FIG. 4, and also to FIGS. 3 and 5, adapter unit 23 may be seen to include a control unit 40 which comprises the bulk of the functions of interface module 21, and which is interconnected with resident low power link transceiver 22, shown in FIG. 5 and discussed in detail above. In the preferred embodiment, control unit 40 includes a microprocessor comprising a Central Processing Unit (CPU) 41 and a Read Only Memory (ROM) 42. Preferably "CPU" 41 actually includes internal ROM program memory and volatile Random Access Memory (RAM) elements, which together function as an operable microcomputer or microprocessor. Control unit 40 includes a crystal 140 for controlling to a precise value an internal clock within CPU 41 and a power supply 141 that utilizes 12-volt vehicle power inputted on terminal 141-1 to provide various regulated voltages required by adapter unit 23.

As shown in FIG. 4, control unit 40 includes a modulator signal processing section 142 that produces on its output terminal 143 a signal that is coupled to modulation input terminal 118 of transceiver unit 22 (FIG. 5) and used to modulate the RF carrier signal of transmitter 34. Modulator signal processing section 142 includes a microphone pre-amplifier 144 connected to audio input terminal 30-1 through a first series mute switch 145. First series mute switch 145 has a control input terminal 146 connected to a (LINE MUTE)* interrupt or control output terminal 147 on CPU 41. First series mute switch 145 blocks audio signals on input terminal 30-1 from being inputted to microphone pre-amplifier 144 when the first series mute switch receives a (LINE MUTE)* command from CPU 41. The output terminal of microphone pre-amplifier 144 is coupled to an Automatic Level Control circuit (ALC) 148. The output terminal of ALC 148 is connected to a limiter 149, which together with the ALC, compresses the dynamic range of speech signals to a pre-determined maximum value. The output terminal of limiter 149 is connected through a second series mute switch 150 to a dynamic range compressor 152. Second series mute switch 150 has a control input terminal 151 that is connected to a transmit mute (TX MUTE) output terminal 153 on CPU 41. Second series mute switch 150 blocks audio signals at the output of limiter 149 from being inputted to compressor 152 when the second series mute switch receives a signal from CPU 41 indicating that the adapter unit 23 is not in a transmit mode.

The output terminal of compressor 152 is coupled through a high pass filter 154 having a lower cutoff frequency of about 300 Hz to a first input terminal 156 of a mixer amplifier 155. The output terminal of mixer amplifier 155 is connected through a low pass filter 157 having an upper cut-off frequency of about 3 Khz to a post amplifier 158, the output terminal of which is connected to modulator signal processing section output terminal 143.

Mixer amplifier 155 of modulator signal processing section 142 has a second input terminal 159 that allows adding DTMF tones to the modulator signal at output terminal 143 of the modulator signal processing section. Input terminal 159 is connected in series with a DTMF mute switch 160 to a DTMF generator 161. DTMF generator 161 is connected to a DTMF data output terminal 162 of CPU 41, and to an external oscillator frequency control crystal 163. Command signals from CPU 41 on output terminal 162 cause selected DTMF tones to be emitted by DTMF generator 161 and coupled through DTMF mute switch 160 to second, DTMF input terminal 159 of mixer amplifier 155. DTMF mute switch 160 has a control input terminal 164 connected to a (DTMF Mute)* output terminal 165 of CPU 41. DTMF mute switch 160 blocks DTMF tone signals from proceeding beyond DTMF generator 161 when the DTMF mute switch receives a signal from CPU 41.

Mixer amplifier 155 has a third input terminal 166 that allows adding ringer/alarm tones to the modulator signal at modulator signal output terminal 143. Input terminal 166 of mixer amplifier 155 is connected in series with a low pass filter 167 having an upper cutoff frequency of about 3 Khz and in series with an Alarm Mute switch 168 to a Ringer/Alarm output terminal 169 of CPU 41. Alarm Mute switch 168 has a control input terminal 170 connected to an Alarm Mute output terminal 171 of CPU 41. Alarm Mute switch 168 blocks ring or alarm signals from being inputted to mixer amplifier 155 when the mute switch receives an Alarm Mute command signal from CPU 41.

Mixer amplifier 155 has a fourth, data input terminal 172 connected through a low pass filter 173 having an upper cutoff frequency of about 3 Khz to a Transmit Data output terminal 174 of CPU 41. Filtered serial data outputted on terminal 174 of CPU 41 and inputted to input terminal 172 of mixer amplifier 155 is impressed on the modulator signal at output terminal 143 of modulator signal processing section 142.

As shown in FIG. 4, control unit 40 of adapter unit 23 includes an audio signal processing section 175 for processing received audio signals on audio output terminal 74 of transceiver 22, FIG. 5, which is connected to audio input terminal (RX AF) 176 of the control unit. Audio signal processing section 175 includes a low pass filter 177 having an input port connected to audio input terminal 126, and an output port connected to a dynamic speech expander circuit 178, the function of which is to decompress audio signals, i.e., expand the dynamic range of the signals to their original values.

The output signal of expander 178 is coupled through a preamplifier 179 to a de-emphasis circuit 180, the function of which is to provide a load impedance on the preamplifier even with switch 181 open. The output signal of de-emphasis circuit 180 is coupled through a series receive mute switch 181 to a first input port 183 of a mixer amplifier 182. Series receive mute switch 181 has a control input terminal 184, which is connected to an (RX MUTE)* output interrupt terminal 185 of CPU 41. When transceiver 22 is not in a receive mode, CPU 41 causes a discrete signal level to appear on (RX MUTE)* output interrupt terminal 185 of CPU 41, of the proper voltage to block transmission of any signals from de-emphasis circuit 180 to mixer amplifier 182.

Mixer amplifier 182 has a second input terminal 186 connected to the output terminal of DTMF mute switch 150, allowing DTMF tones generated under command of CPU 41 to be impressed on the output terminal of mixer amplifier 182, which is connected to audio output terminal 32-1 of adapter unit 23. As indicated in FIGS. 3 and 4, audio output terminal 32-1 of adapter unit 23 is connected to the earphone or speaker of an existing cellular telephone handset.

Control unit 40 also includes a number of signal input terminals that are connected to interrupt or data input ports of CPU 41. These include a ring detect terminal 30-2 connected externally to the existing cellular telephone transceiver, and internally through a BELL Detect circuit 187 to an input port 188 of CPU 41. In the preferred embodiment, a multi-pole option-select switch 189 is connected to a parallel data entry input port 190 of CPU 41, and is used to select operational program options for adapter unit 23. Typical of such options is pulse dialing rather than DTM tones, for example.

Control unit 40 includes an RX data input terminal 190 that is connected externally to RX data output terminal 77 of transceiver 22, and internally through an RX data detect circuit 191 to a serial data input port 192 in CPU 41.

Control unit 40 has an FLS1 input terminal 193 connected externally to 20-db. noise level detect output terminal 128 of transceiver 22, and internally to a data input port 194 of CPU 41. An FLS2 input terminal 195 of control unit 40 is connected externally to 30-db. noise level detect output terminal 138 of transceiver 22, and internally to a data input port 196 of CPU 41. Input terminal 197 of control unit 40 is connected externally to the Unlock status output terminal 89 of frequency synthesizer 37 of transceiver 22, and internally to data input port 198 of CPU 41.

Control unit 40 also includes a number of output terminals connected to data or discrete output ports of CPU 41, that are used to control operation of frequency synthesizer 37. Thus, output port 199 of CPU 41 emits a continuous clock signal which is connected internally to output terminal 200 of control unit 40, and externally to clock input terminal 93 of frequency synthesizer 37. Output terminal 201 of CPU 41 emits serial data which are coupled through output terminal 202 of control unit 40 to serial data input terminal 91 of frequency synthesizer 37 in transceiver 22. Output terminal 203 of CPU 41 emits reset signals through output terminal 204 of control unit 40 to Reset input terminal 92 of frequency synthesizer. Reset signals are used to clear registers in frequency synthesizer 37, allowing serial data on output terminal 202 accompanied by a synchronizing clock signal on output terminal 200 of control unit 40 to be entered into the frequency synthesizer, which data are used to set the operating frequencies of both transmitter 34 and receiver 35 to precisely determined values.

Control unit 40 includes a series switch 206 which outputs operating power on output terminal 207 for the phase-lock loops 37-1 and 37-2 of frequency synthesizer 37, when commanded by a discrete signal on output port 205 of CPU 41.

The foregoing material describes the structure and some of the functions of the transceiver 22 and control unit 40 that comprise most of adapter unit 23. More details of the functional operation of adapter unit 23 will be given below, after the following description of the structure and function of cordless hand-held handset/transceiver unit 26.

Figure 6:
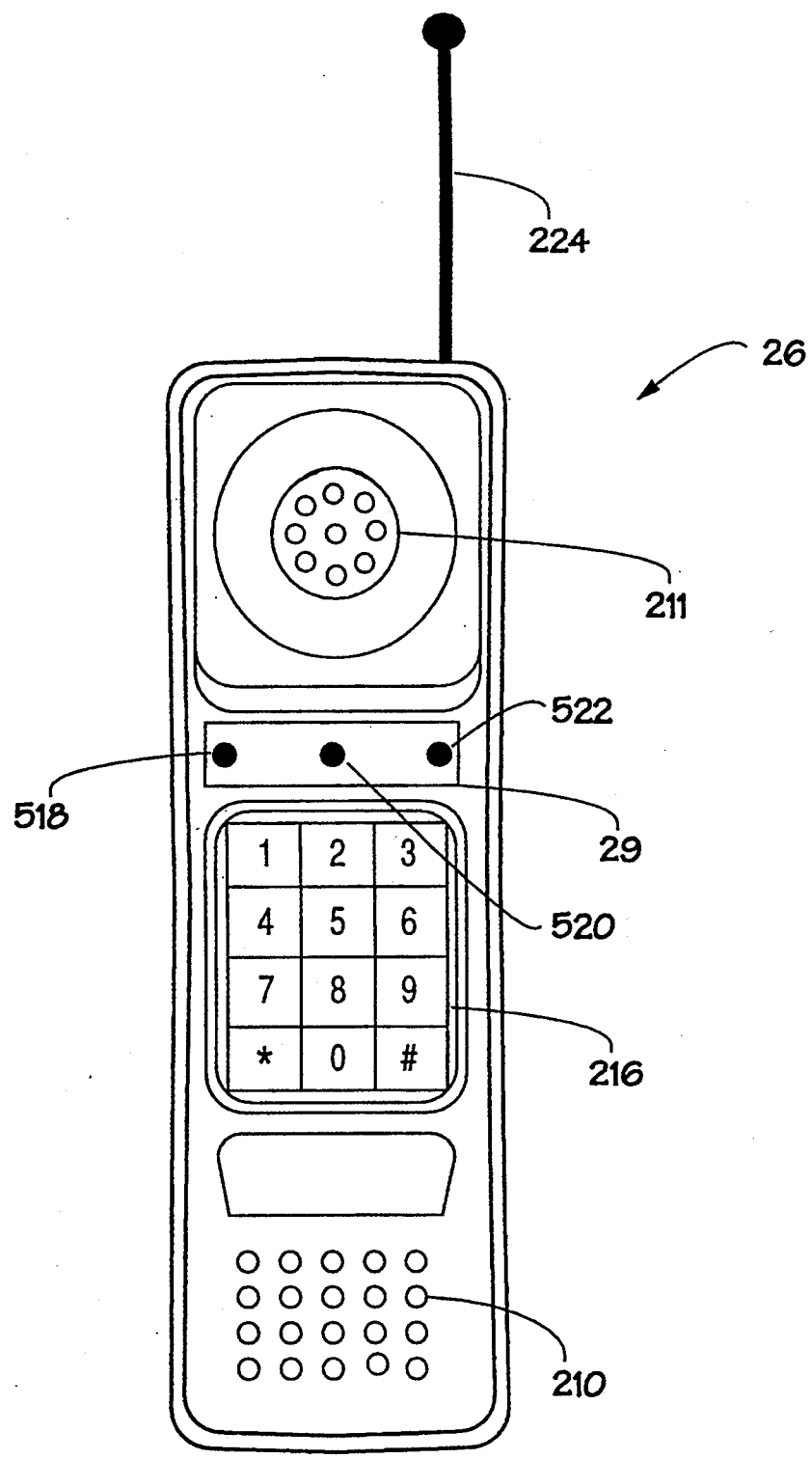
FIG. 6 is an upper plan view of the handset comprising part of the apparatus of FIG. 2 enlarged to approximately full size.
Figure 7:
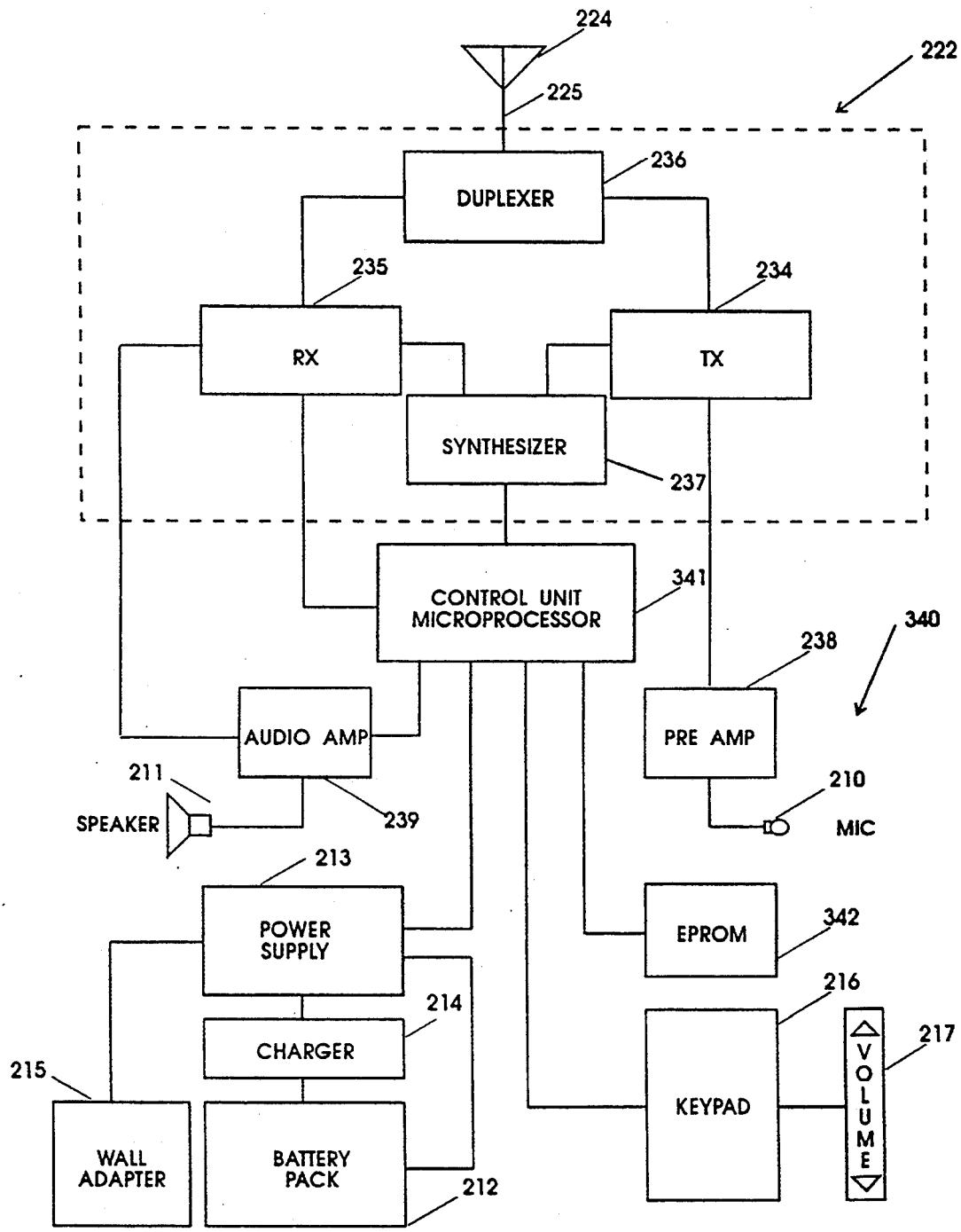
FIG. 7 is a block diagram of the portable handset unit of FIG. 6.
Figure 8:
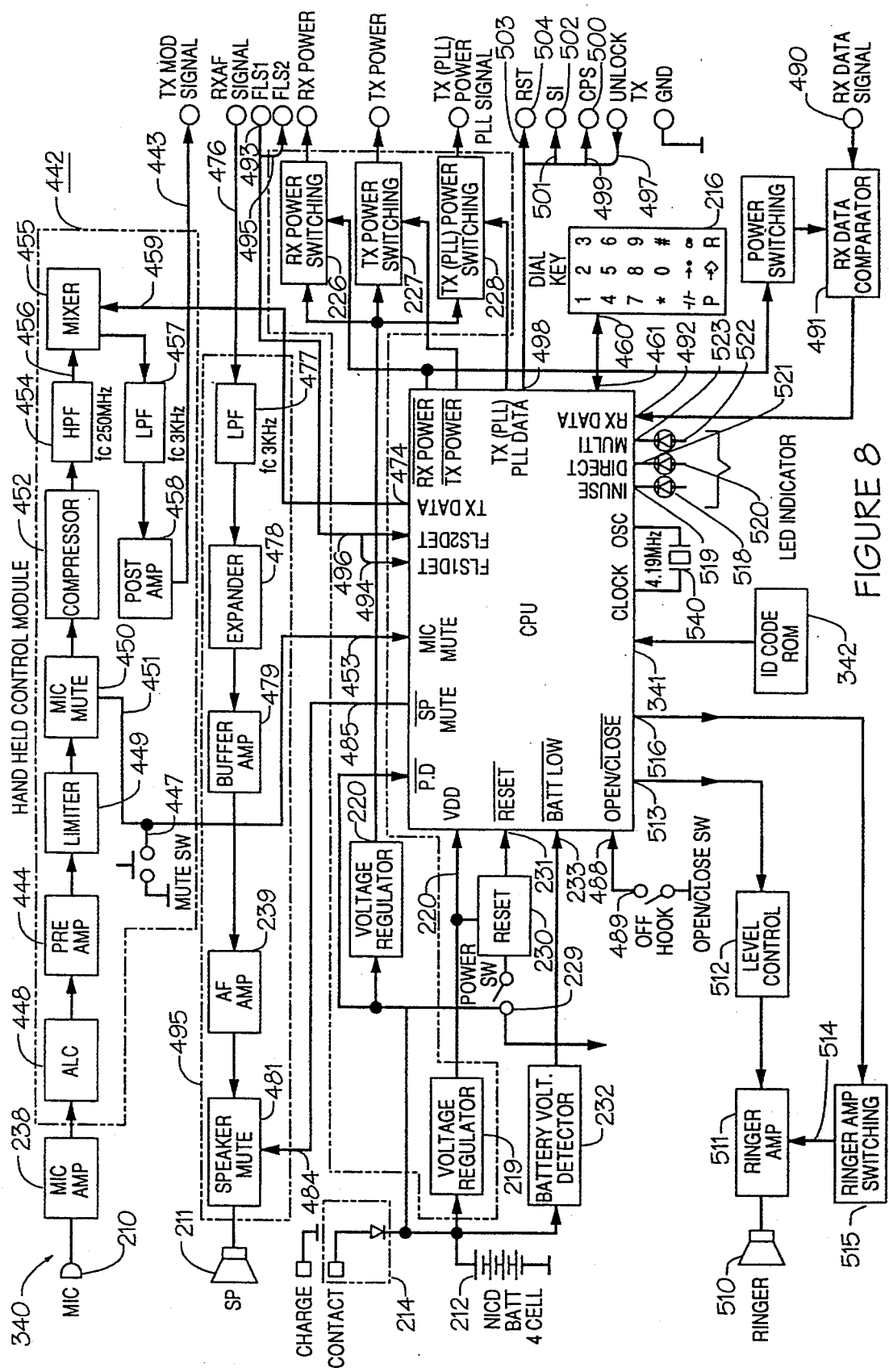
FIG. 8 is a partly schematic block diagram of a control module comprising part of the handset unit of FIG. 7.
Figure 9:
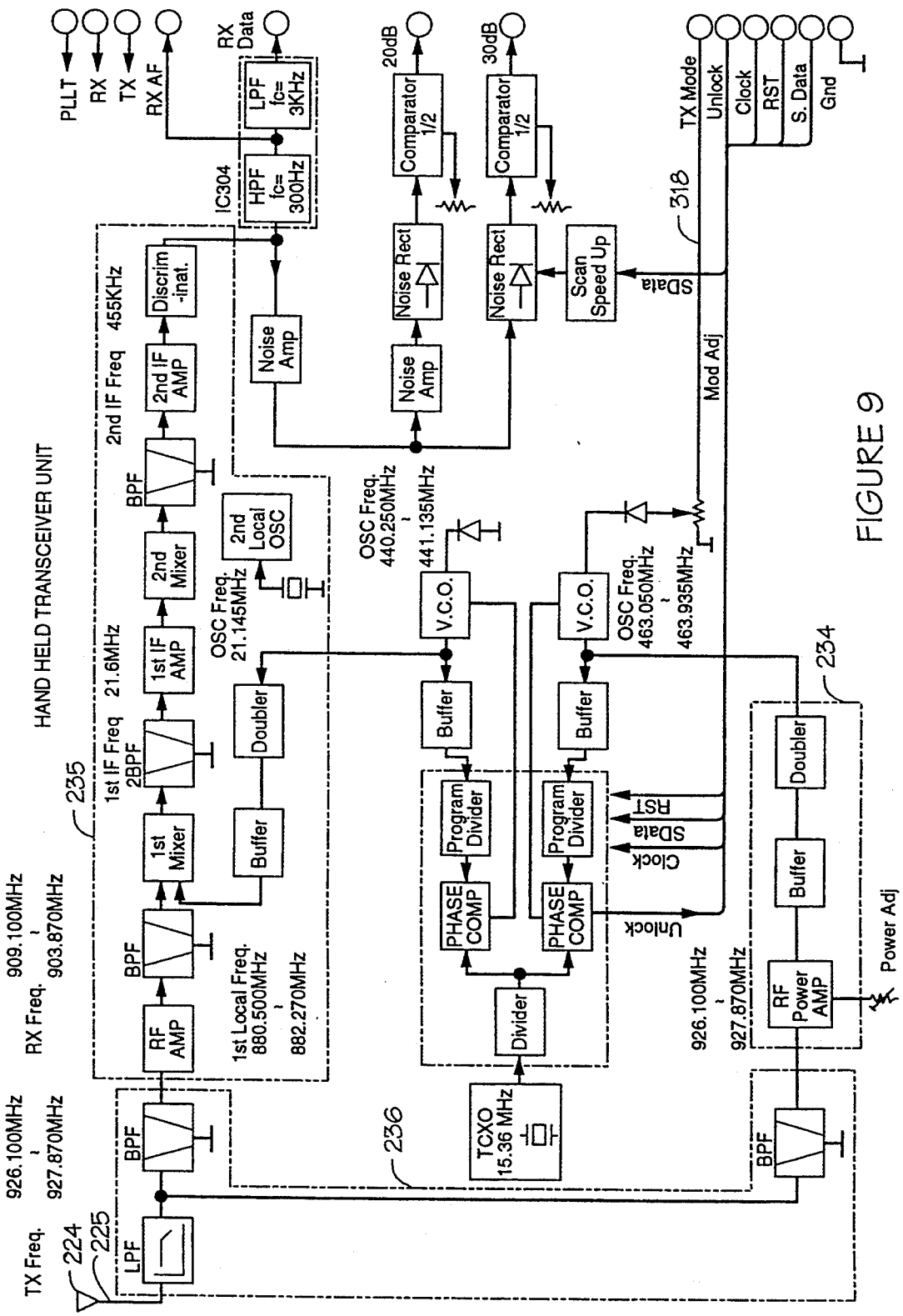
FIG. 9 is a partly schematic block diagram of a transceiver module comprising another part of the handset unit of FIG. 7.

Referring now to FIGS. 6–8, and particularly to FIG. 6, cordless hand-held handset/transceiver unit 26 may be seen to include a transceiver 222, and a control unit 340. Transceiver 222 is substantially identical in structure and function to transceiver 22 of adapter unit 23, shown in FIGS. 3 and 5. However, hand-held transceiver 222 preferably operates at a peak transmitted power level of about 0.13 mw, while resident base transmitter 22 preferably operates at a peak transmitted power level of about 0.13 mw. Hand-held transceiver 222 operates at the same radio frequencies as those of resident link transceiver 22, i.e., at frequencies different from those used by existing mobile transceiver 13.

As shown in FIG. 6, transceiver 222 includes an RF transmitter 234, and an RF receiver 235. The output port of transmitter 234 and input port of receiver 235 are connected to separate parts of a duplexer 236, the latter having an output port connected to a single antenna 224 by means of an RF power cable 225. The function of duplexer 236 is to permit transmitter 234 and receiver 235 to use the same antenna 224 while protecting the receiver from high transmitter power levels which might damage the receiver. Transceiver 222 also includes a frequency synthesizer 237 for producing an RF carrier signal for transmitter 234, and an RF beat or heterodyne frequency for receiver 235, which is of the superheterodyne type.

As shown in FIG. 6, cordless hand-held unit 26 includes a control unit 340. The function of control unit 340 is to control the operation of the various components of cordless hand-held unit 26, provide electrical power to the various components of the hand-held unit, receive and transmit audio information, and perform telephone number entry and other functions of a telephone. Control unit 340 includes a microprocessor 341, the operation of which is controlled in part by an electrically programmable read only memory (EPROM) 342. Under program control, microprocessor 341 processes digital data and status signals received from other components of cordless handset 26, and emits command signals which control the operation of transmitter 234, receiver 235 and other components of the cordless handset. Handset 26 includes a microphone 210 coupled through a preamplifier 238 to transmitter 235. The function of preamplifier 238 is to amplify speech signals to a level sufficient to modulate at a desired percentage level the RF carrier signal produced by transmitter 234. Handset 26 also includes an audio amplifier 239 and loudspeaker 211. Amplifier 239 amplifies demodulated audio signals from receiver 235 to a level sufficient to drive loudspeaker 211.

Also included within handset 26 is a re-chargeable battery pack 212 and power supply 213 used to power the various components of the handset, and a battery charger 214 and wall adapter 215 that permit the re-chargeable battery pack to be re-charged by household current. Handset 26 also includes a keypad 216 and volume control 217.

FIG. 7 and 8 illustrate in more detail the structure and function of control unit 240 and transceiver 222 of handset 26.

Referring first to FIG. 8, and comparing it with FIG. 5, it may be seen that handset transceiver 222 is substantially identical in structure and function to resident base unit transceiver 22. In FIG. 8, each element 34–139 of handset transceiver 222 is designated by a number equal to the element number of the corresponding element of transceiver 22 of resident transceiver 22 of FIG. 5, plus 200. Thus, for example, FIG. 8 shows a duplexer designated by the element number 236, while FIG. 5 shows the identical duplexer designated by the element number 36. Because of the aforementioned one-for-one correspondence of reference designations of elements 34–139 in FIG. 5, to elements 234–339 in FIG. 8, a complete understanding of the structure and function may be obtained by referring to the description of transceiver 22 given above.

Referring now primarily to FIG. 7, and also to FIGS. 6 and 8, handset 26 may be seen to include a control unit 340, which is interconnected with handset low power link transceiver 222, shown in FIG. 8, and discussed in detail above. In the preferred embodiment, control unit 340 includes a microprocessor comprising a central processing unit (CPU) 341 and a Read Only Memory (ROM) 342. Preferably, "CPU" 341 actually includes internal ROM program memory and volatile Random Access Memory elements, which together function as an operable microcomputer or microprocessor. Control unit 340 includes a crystal 440 for controlling to a precise value an internal clock within CPU 341, and a power supply 213.

Power supply 213 includes a first voltage regulator 218 for supplying regulated power to $+V_{DD}$ input power terminal 219 of CPU 341. Power supply 213 also includes a second voltage regulator 220. Second voltage regulator 220 provides power to three switching power supplies; RX Power 226, TX Power 227, and TX PLL Power 228. Handset 26 includes a power switch 229 having one set of contacts that is in series with the positive terminal of battery pack 212 and a Power-On Reset circuit 230. When power switch 229 is closed, Power-On Reset circuit 230 emits a momentary reset pulse which is inputted to (RESET)* input terminal of CPU 341. The momentary reset pulse resets registers within CPU 341 to permit initiation of normal sequential operation of the CPU. Control unit 340 also includes a low battery voltage detector 232 having an input terminal connected to battery pack 212 and an output terminal connected to a (BATTERY LOW)* input interrupt terminal of CPU 341. When the voltage of battery pack 212 drops below a pre-determined threshold value, a signal is emitted by battery voltage detection 232 that causes CPU 341 to issue a beeping tone audio signal and a flashing command signal to LED 520.

As shown in FIG. 7, control unit 340 of handset 26 includes a modulator signal processing section 442 that produces on its output terminal 443 a signal that is coupled to modulation input terminal 318 of transceiver unit 222 (FIG. 8) and used to modulate the RF carrier signal of transmitter 234. Modulator signal processing section 442 includes a pre-amplifier 444 and an ALC circuit 448 connected in series with a limiter 449. The output terminal of limiter 449 is connected through a Microphone Mute FET switch 450 to a Dynamic Range Compressor 452. Microphone Mute switch 450 has a control input terminal 451 that is connected to a mechanical push button mute switch 447. Push button mute switch 447 is also connected to a Microphone Mute input terminal 453 of CPU 341. Actuating push button mute switch opens Microphone Mute series switch 450, preventing microphone signals from being outputted on output terminal 443 of modulator signal processing section 442, and providing a status control signal to input terminal of CPU 341.

The output terminal of compressor 452 is coupled through a high pass filter 454 having a lower cutoff frequency of about 300 Hz to a first input terminal 456 of a mixer amplifier 455. The output terminal of mixer amplifier 455 is connected through a low pass filter 457 having an upper cut-off frequency of about 3 Khz to a post amplifier 158, the output terminal of which is connected to modulator signal processing section output terminal 443.

Mixer amplifier 455 of modulator signal processing section 442 has a second input terminal 459 that allows digital data to be impressed on the modulator signal at output terminal 443 of the modulator signal processing section. Serial data outputted on TX Data terminal 474 of CPU 41 and inputted to input terminal 459 of mixer amplifier 455 is impressed on the modulator signal of output terminal 443 of modulator signal processing section 442.

As shown in FIG. 7, control unit 340 of handset 26 includes an audio signal processing section 475 for processing received audio signals on audio output terminal 274 of transceiver 222, FIG. 8, which is connected to audio input terminal (RX AF) 476 of the control unit. Audio signal processing section 475 includes a low pass filter 477 having an input port connected to a dynamic range expander circuit 478. The output signal of expander 478 is coupled through a buffer amplifier 479 to audio frequency amplifier 239. The output signal from audio frequency amplifier 239 is coupled through a series Speaker Mute FET switch 481 to speaker 211. FET switch 481 has a control input terminal 484 which is connected to a (SPEAKER MUTE)* output interrupt terminal 485 on CPU 341. Under control of CPU 341, a discrete signal level appearing on terminal 485 of CPU 341 blocks signals inputted to Speaker Mute switch 481 from being inputted to speaker 211.

Control unit 340 also includes a number of signal input terminals that are connected to interrupt or data input ports of CPU 341. These include an OFF-HOOK input port 488 connected to an OFF-HOOK microswitch 489 located on handset 26 and actuated by pivoting a flip-up cover door into an operating position.

Control unit 341 also includes an RX Data input terminal 490 that is connected externally to RX Data output terminal 277 of transceiver 222, and internally through an RX Data comparator circuit 491 to a serial data input port 492 of CPU 341.

Control unit 341 also has a FLS1 input terminal 493 connected externally to 20-db. noise level detect output terminal 328 of transceiver 222, and internally to a data input port 494 of CPU 341. An FLS2 input terminal 495 of control unit 340 is connected externally to 30-db. noise level detect output terminal 338 of transceiver 222, and internally to a data input port 496 of CPU 341.

Input terminal 497 of control unit 340 is connected externally to the Unlock status output terminal 289 of frequency synthesizer 237 of transceiver 222, and internally to data input port 498 of CPU 341.

As shown in FIG. 7, keypad 216 of handset 26 has an output port 460 connected to a data input port 461 of CPU 341.

Control unit 340 of handset 26 also includes a number of output terminals connected to data or discrete output ports of CPU 341, that are used to control operation of frequency synthesizer 237. Thus, output port 499 of CPU 341 emits a continuous clock signal which is connected internally to output terminal 500 of control unit 340, and externally to Clock INPUT terminal 293 of frequency synthesizer 237, FIG. 8. Output terminal 501 of CPU 341 emits serial data which are coupled through output terminal 502 of control unit 340 to serial data input terminal 291 of frequency synthesizer 237 in transceiver 222. Output terminal 503 of CPU 341 emits reset signals through output terminal 504 of control unit 340 to Reset input terminal 292 of frequency synthesizer 237, allowing serial data on output terminal 502 accompanied by a synchronizing clock signal on output terminal 500 of control unit 340 to be entered into the frequency synthesizer, which data are used to set the operating frequencies of both transmitter 234 and receiver 235 to precisely determined values.

As shown in FIG. 7, handset 26 includes a ringer transducer 510 driven by a ringer amplifier 511. Ringer amplifier 511 has an input terminal connected to the output terminal of a level control circuit 512. Level control circuit 512 is connected to a Ringer Select discrete output terminal 513 of CPU 341. Ringer amplifier 511 also has a control input terminal 514 connected to the output terminal of a ringer amplifier switching control circuit 515 that has an input terminal connected to an output Switching Control terminal 516 of CPU 341. Level control circuit 512 functions as a switch under control of CPU 341, causing the volume of ringer 510 to be high when handset 26 is in use, and causing the ringer to emit a buzzing sound at low volume if the voltage of battery pack 212 drops below a pre-determined value.

As shown in FIGS. 2 and 7, front panel 517 of handset 26 contains LED's (Light Emitting Diodes) that indicate the operating status of the handset. Thus, an Inuse LED 518 connected to an output port 519 of CPU 341 indicates that the handset 26 is in use. A Direct LED 520 connected to an output port 521 of CPU indicates that the voltage of battery pack 212 is below a pre-determined minimum value. And a Multi LED 522 connected to an output port 523 indicates that handset 26 is in either a recall mode, or a mode in which phone numbers are being programmed into the handset.

The structure and function of individual components of cordless range extension apparatus 20 have been described in some detail above. The overall functional operation of the apparatus may now be best understood by referring to FIGS. 13–16.

Figure 10:
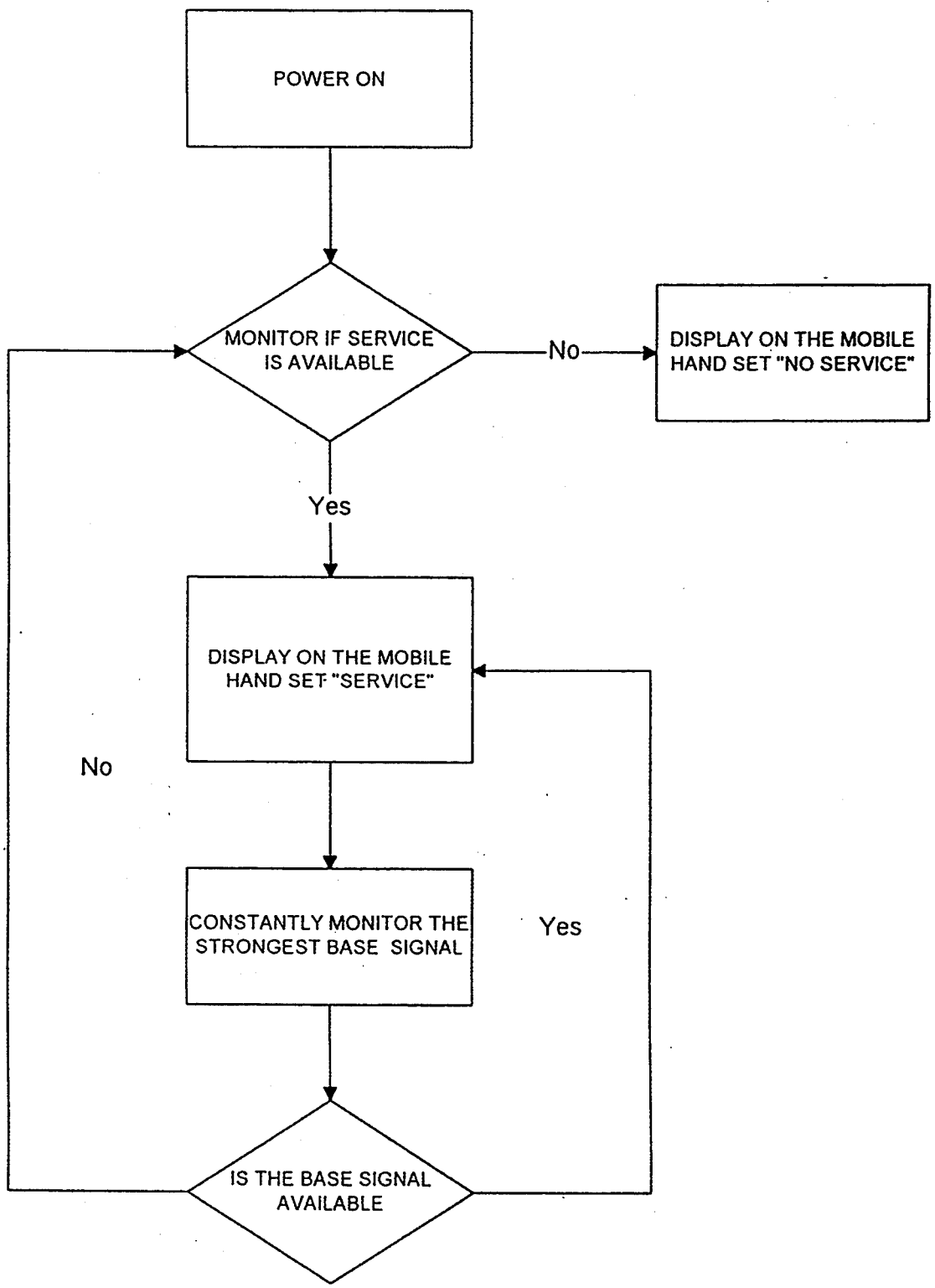
FIG. 10 is a flow chart showing the sequence of functions performed in initiating operation of a conventional prior art cellular mobile telephone (CMT) of the type shown in FIG. 1.
Figure 11:
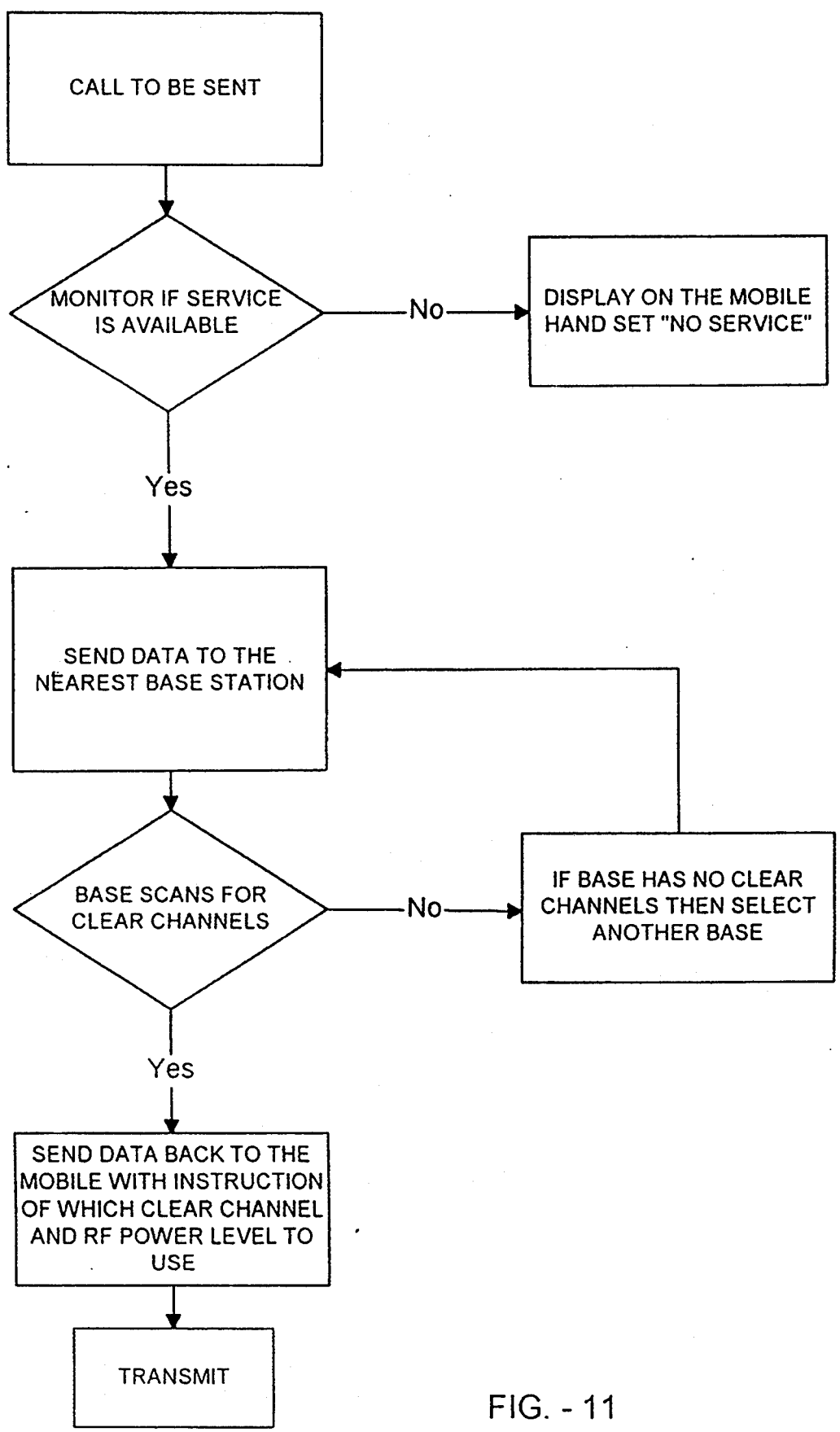
FIG. 11 is a flow chart showing a sequence of operations performed in making a call from a conventional CMT.
Figure 12:
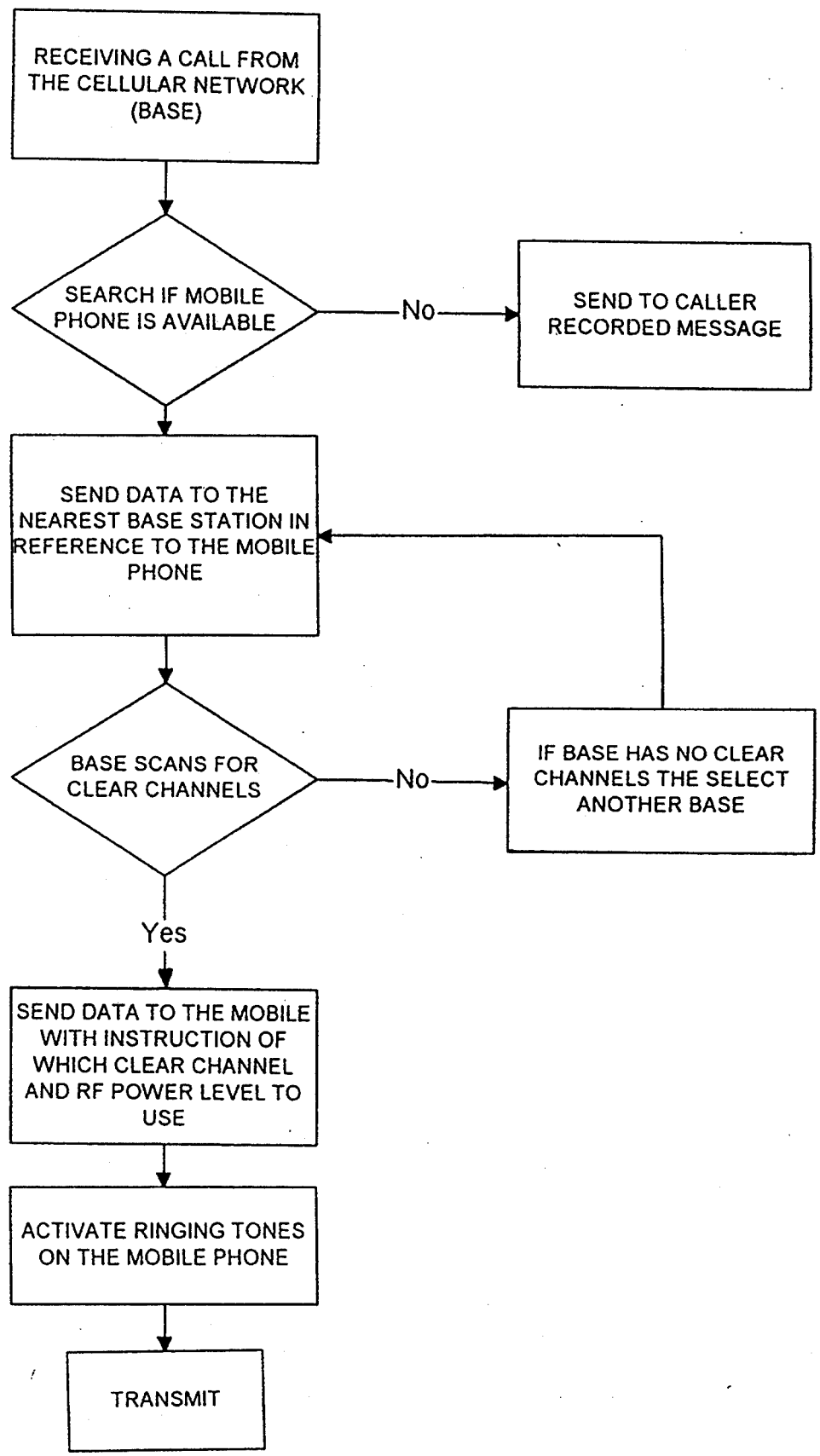
FIG. 12 is a flow chart showing the sequence of functions performed in receiving a telephone call by a CMT.

The functions performed by the novel cordless range extension accessory apparatus for radio telephones according to the present invention may be best understood by first reviewing the functions performed by a conventional prior art cellular mobile telephone (CMT), as depicted in FIGS. 10 through 12.

Thus referring first to FIG. 10, activating the POWER-ON switch of a conventional cellular mobile telephone (CMT), of the type indicated by the numeral 10 in FIG. 1, causes the receiver within the CMT to "look for" an RF PAGING CHANNEL signal coming from the cellular network and indicating that cellular service is available. If service is not available, the CMT phone will display a NO SERVICE signal on a liquid crystal display (LCD) or similar display device. If service is available, the phone will display SERVICE, and the CMT will constantly monitor base transmitters in the cellular network, switching the transmitter and receiver channels of the CMT to permit communications with that base station having the strongest signal received by the CMT. If the strongest transmitted base signal received by the CMT drops below a predetermined value, the CMT will once again initiate a frequency scan to determine if service is available.

FIG. 11 illustrates the sequence of operations performed in making a call from the CMT, after the POWER-UP and SERVICE AVAILABLE operations described above have been executed. To make a call from the CMT, the number to be called is entered on the keypad of the CMT handset and a SEND button on the handset is actuated. The CMT will once again verify that service is available. If service is not still available, a NO-SERVICE message will be displayed. If service is available, a data signal is transmitted by the CMT to the nearest base station. The base station then scans through the set of available communication channels to find a clear channel. If no clear channel is available, the base channel will send back a status signal to the CMT indicating that fact, causing the CMT to select another base station that may have a clear channel. This process is repeated until a base station is found which has a clear channel available. When such a base station has been interrogated by RF signals from the CMT, the base station sends back data signals to the CMT that identify which frequency channels the transmitter and receiver of the CMT transceiver should be set to, and what RF power level the CMT transmitter should operate at. The CMT transceiver then operates in two-way communication through the base station to a selected telephone number.

FIG. 12 illustrates a typical sequence of operations occurring in the reception of a telephone call by a CMT. As shown in FIG. 12, when a cellular network base station receives a call for a mobile telephone number from a fixed or mobile telephone, the base station transmits on the paging channel a data hailing signal containing the CMT number. If the base station receives no response to the hailing signal, the base station plays to the caller a recorded message saying that the cellular mobile telephone is "out of radio range" or "unattended."

If, however, the base station sending the hailing signal receives a transponder response signal indicating that the CMT having the mobile telephone number dialed is in the service area of the cellular network, a data message is sent from the initiating base station to the base nearest to the referenced CMT. The selected base station scans for clear channels, and if none are found, hands off the waiting telephone call to the next nearest base station. When a base station finds a clear channel, a data signal is sent to the CMT with instructions as to which CMT transceiver transmitter and receiver frequency channels to use, and what transmitter RF power level to operate on. The ringer on the CMT handset is then activated, at which time the CMT user may pick up the handset, generating an off-hook signal which permits two-way conversations with the party that originally dialed the CMT number.

Having described the functions typical of operation of a conventional CMT, the novel features and advantages of the Cordless Range Extension Apparatus for Radio Telephones may be best understood by reference to the previously discussed FIGS. 2–8, in conjunction with FIGS. 13–16.

Figure 13:
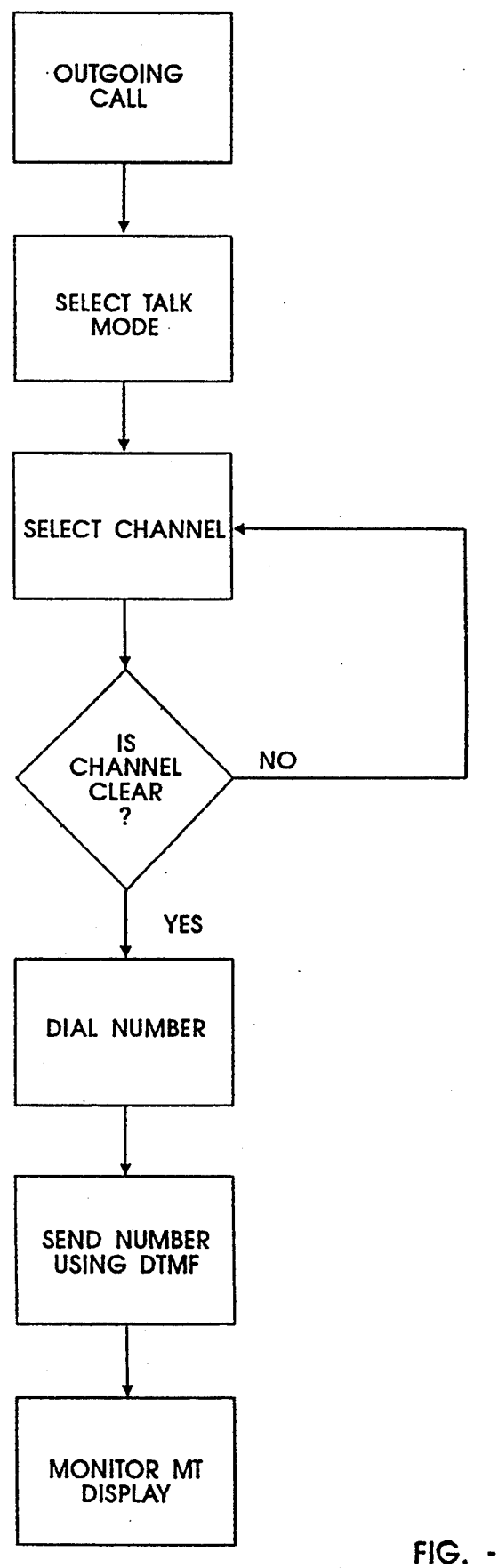
FIG. 13 is a flow chart showing how a call may be initiated from a remote cordless handset of the apparatus of the present invention shown in FIG. 2.
Figure 14:
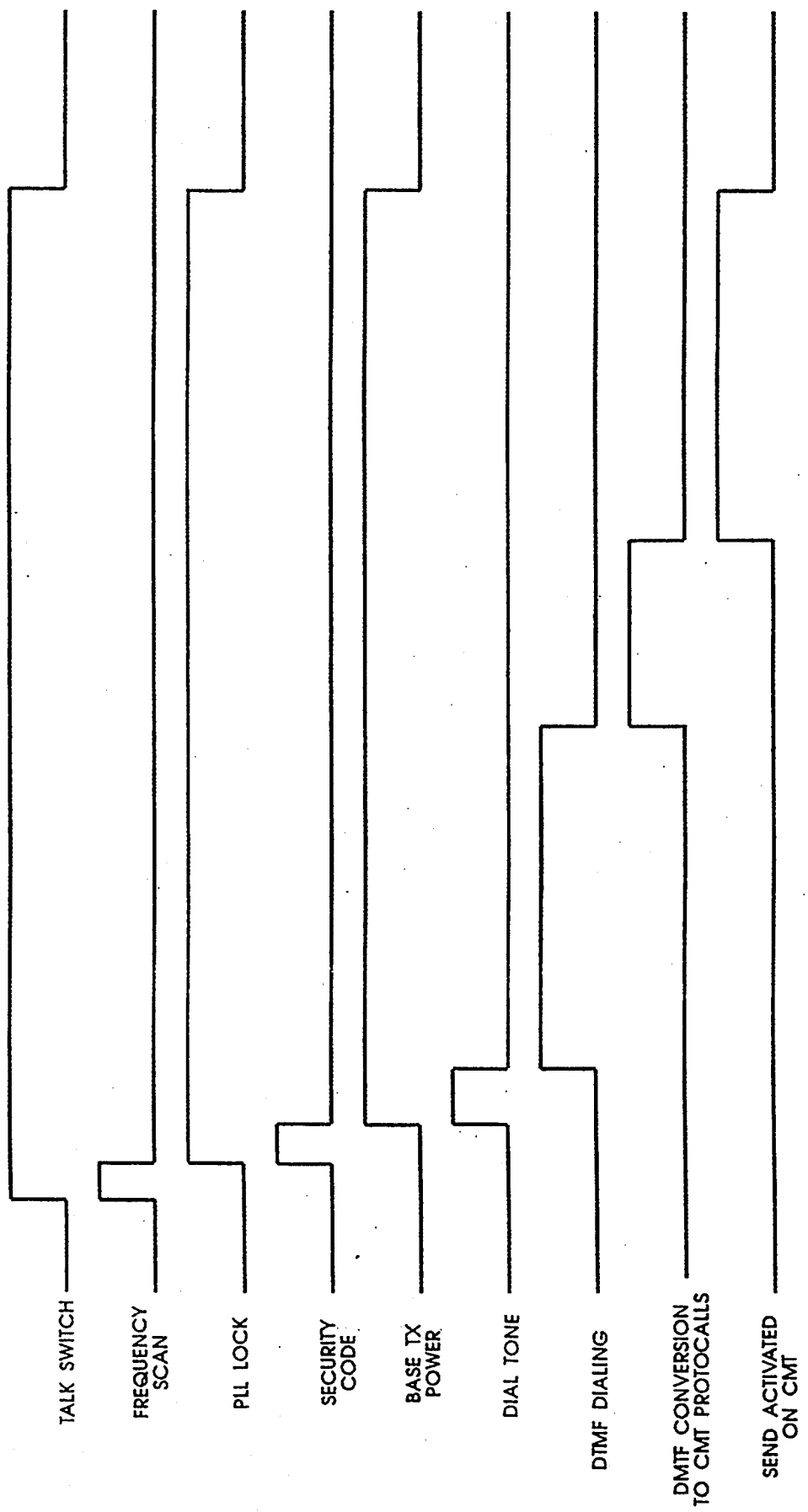
FIG. 14 is a timing diagram showing the relative time relationship of key events occurring during the initiation of calls from the cordless handset of FIG. 2.

FIGS. 13 and 14 illustrate the sequence of operations performed by the cordless range extension accessory apparatus 20 of FIGS. 2–8, by which a telephone call may be initiated from a remote handset 26 of the apparatus, at a low power level, and transmitted into a cellular network at high power by vehicle-mounted transceiver 13. Thus, to initiate a call, a flip-up cover on handset 21 is opened activating off-hook switch 489 (FIG. 8). As shown in FIG. 8, power-on switch 229 must also be activated to operate handset 26. At this time, CPU 341 of handset 26 causes frequency scan commands to be issued to frequency synthesizer 237. The purpose of the frequency scan is to select from a group of transmitter and receiver frequency channels different from those used by existing CMT cellular networks an available duplex transmission channel. Upon locating a clear channel signal, both receiver and transmitter phase lock loops in handset transceiver 222 become locked. At this time, handset transceiver 222 transmits on the clear channel transmitter frequency a security code to resident transceiver 22. If the security code matches the identity code of resident transceiver 22, the resident transmitter sends back a dial tone on an RF carrier signal to handset transceiver 222. Upon hearing the dial tone, a person holding handset 26 may enter a telephone number on keypad 216. This results in a sequence of DTMF tones corresponding to the number dialed to be transmitted to handset transceiver 222 to resident down-link transceiver 22 in adapter 23. Under control of CPU 41 in control unit 40 of adapter 23, the received DTMF signals are converted to digital signals of the same format or protocol that is used by the existing CMT to convey numbers from the existing CMT handset to the existing mobile transceiver 22. In response to those digital signals, the SEND function of CMT transceiver 13 is activated, causing the number entered in keypad 216 of handset 26 to be transmitted over the cellular network. Upon reaching the number dialed, voice or data signals from the party dialed may be transmitted back over the cellular network to transceiver 13, where the voice and/or data signals are demodulated from the carrier and outputted from transceiver 13. However, rather than be conveyed to handset 12, these signals are interrupted by interface module 21, and used to modulate a down-link RF carrier signal transmitted by transmitter 34 of down-link transceiver to receiver 235 of handset 26. Voice signals received are processed by the transceiver circuitry 222 and control circuitry 340 of handset 26, and outputted on speaker 211 of the handset. Data signals received are inputted to CPU 341, where they may be used to control functions of the handset circuits, outputted to a telefax modem or computer modem, or perform other such functions.

In response to digital or voice signals received by transceiver 222 of handset 26, voice signals from microphone 210, and/or data signals from output port 474 of CPU 341, are used to modulate the up-link RF carrier signal transmitted by handset transmitter 234. These signals are received by receiver 35 of adapter unit transceiver 22, demodulated, and conveyed to CMT transceiver 13, where they are used to modulate the high power CMT carrier and transmitted onto the cellular network, as described above.

Figure 15:
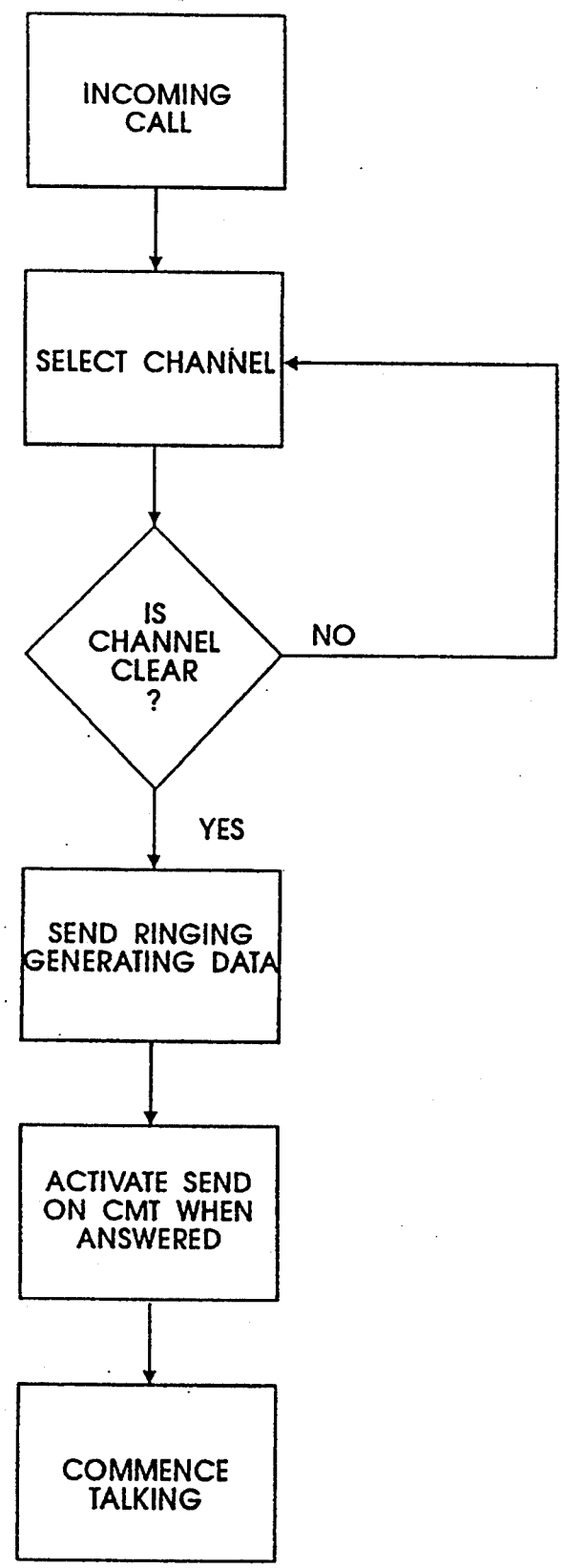
FIG. 15 is a flow chart showing how a call received by a CMT is relayed to a remote cordless handset of the apparatus shown in FIG. 2.
Figure 16:
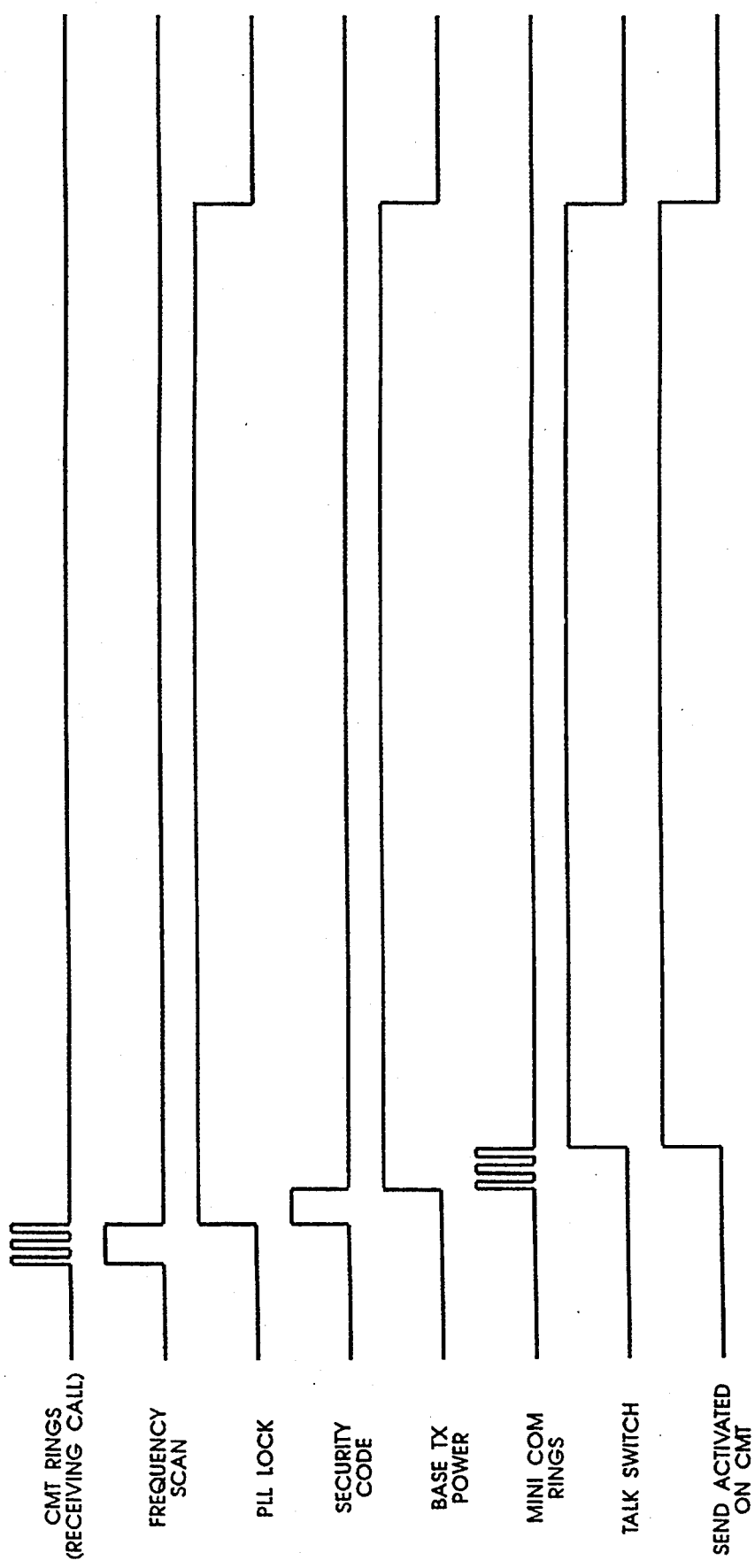
FIG. 16 is a timing diagram showing the relative time relationship of key events occurring during reception of calls by the remote cordless handset from a CMT.

FIGS. 15 and 16 illustrate the sequence of operations performed by the cordless range extension apparatus 20 of FIGS. 2-8, by which a telephone call made to a CMT 12, 13, 15 and. 16 connected to an adapter unit 21 may be received by portable remote handset/transceiver 26.

Referring first to FIG. 12 and the description of receiving a call by a CMT given above, the second last block of FIG. 12 depicts activation of a ringer within the existing CMT handset. For a CMT interconnected with the cordless range extension apparatus 20 according to the present invention, activation of the CMT ringer upon reception of a call from a call directed through the cellular network initiates a sequence of functions of adapter unit 21 and remote cordless handset/transceiver 26 which permits the down-linking of the incoming call to the handset. Initiation of this sequence is depicted in the first block of the flow chart of FIG. 15, and the first line of the timing diagram of FIG. 16. upon receiving a CMT ringer signal announcing receipt of a call from the cellular network, CPU 41 of adapter unit 23 causes frequency scan commands to be issued to frequency synthesizer 37. The purpose of the frequency scan is to select from a group of transmitter and receiver frequency channels different from those used for existing CMT cellular networks an available duplex transmission channel. Upon locating a clear channel, transmitter and receiver phase lock loops in resident transceiver 22 become locked. At this time, resident down-link transceiver 22 transmits on the selected clear channel transmitter frequency a security code to handset transceiver 222. If the security code matches the identity code of handset transceiver 222, the handset transmitter receives a POWER ON command, and ringer 510 is activated. Upon hearing the ring, a person near the handset 26 may open a flip-up cover, activating a talk switch. This action causes a data signal to be transmitted by handset transmitter 234 to adapter unit receiver 235, which in turn causes a SEND command signal to be issued from the adapter unit to CMT transceiver 13. Then, when voice or data signals are transmitted from handset 26 to adapter unit 23, these signals are used to modulate the high power carrier signal transmitted by CMT transceiver 13, as described above.

Different cellular networks utilize different frequency bands and differing number of channels. A typical cellular network may include 600 to 800 channels in a frequency band of about 825 to 890 mhz. However, a given cellular base station typically employs a fewer number of channels, 20-25, for example.

Each cellular channel consists of two subchannels to permit simultaneous transmission and reception of signals between two parties, in an arrangement referred to as full duplex. Thus, for example, a first channel in a cellular network might have a first subchannel having a frequency of 825 mhz and a bandwidth of 15 khz, and a second subchannel having a center frequency of 849 mhz and a bandwidth of 15 khz. Channel 2 would have subchannel center frequencies spaced 30 khz apart from the respective center frequencies of the channel 1 subchannels, and so In an example embodiment of the present invention, channels and subchannels having the same bandwidth and frequency separation, but different center frequencies outside the band of the cellular network were used. Thus, the example system employed 200 channels, in which the center frequency of remote handset transmitter 234 lies within the bandwidth range of 926.100 mhz to 927.870 mhz, while the center frequency of receiver 235 lies within the bandwidth range of 909.100 mhz to 903.870 mhz.

Figure 17:
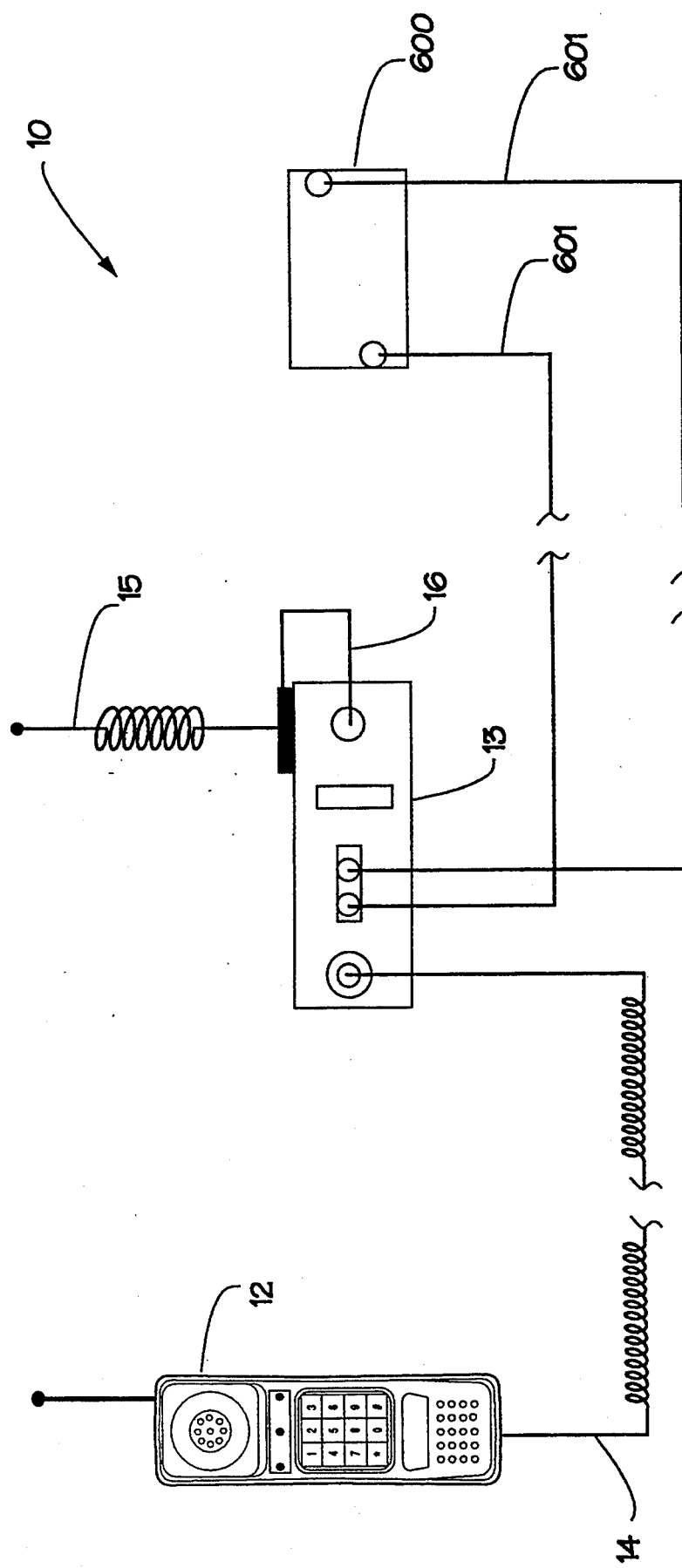
FIG. 17 is a partly schematic view of a typical Cellular Mobile Telephone (CMT) apparatus, of the type shown in FIG. 1.
Figure 18:
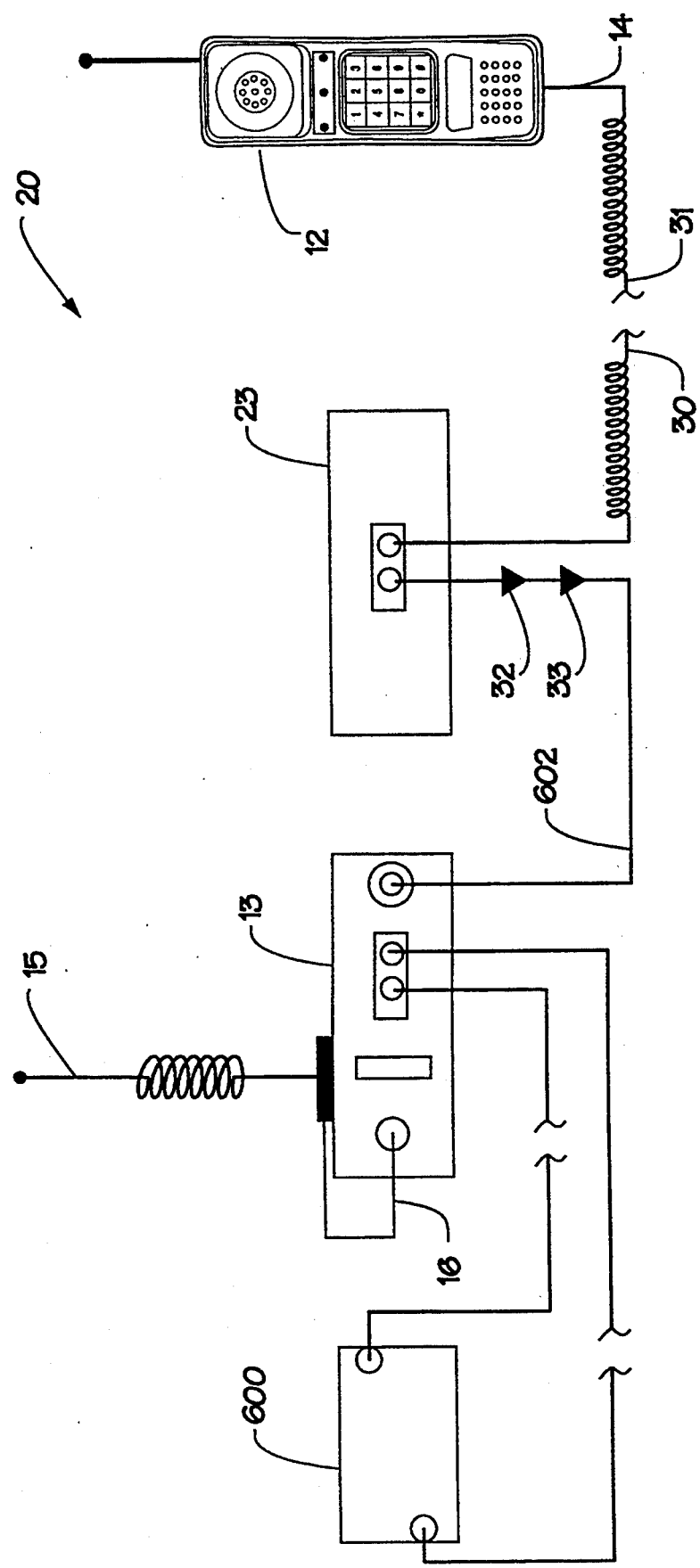
FIG. 18 is an upper perspective view of the cordless range extension apparatus of the present invention, showing the apparatus interconnected with a CMT.

FIGS. 17-18 illustrate the ease with which the novel cordless range extension apparatus according to the present invention may be interfaced With an existing vehicle-mounted cellular mobile telephone (CMT).

As shown in FIGS. 17 and 18, a conventional mobile telephone (CMT) includes a handset 12 connected by a flexible multi-conductor cable 14 to a transceiver unit 13. Transceiver unit 13 is connected to an external antenna 15 by means of a coaxial cable 16, and to a vehicle battery 600, by means of a flexible power cable 601. As shown in FIG. 18, adapter unit 23 is interconnected with existing CMT 10 by simply unplugging handset cable 14 from CMT transceiver 13, and plugging the cable into adapter unit 23, and plugging a cable 602 from the adapter unit into the CMT transceiver. After these interconnecting operations, a remotely located handset 26 of cordless range extension apparatus 20 may communicate with a cellular network through the CMT transceiver, as was described above.

What is claimed is:

1. An extension accessory apparatus for cellular mobile telephones (CMT's) having a handset and a transceiver, said apparatus comprising;
   a. adapter means-interconnectable between said handset and said transceiver, said adapter means including,
      (i) first, resident low power down-link transceiver means having (A) a down-link transmitter of lower power output than that of the transmitter of said CMT transceiver, and an operating frequency different from those of both said CMT transmitter and the receiver of said CMT transceiver, (B) means for modulating a carrier signal produced by said down-link transmitter means with CMT information signals received by said CMT transceiver, (C) up-link receiver means for receiving an up-link carrier signal modulated with up-link information signals, said up-link carrier having a frequency different from those of said CMT transmitter and said down-link transmitter, and (D) means for modulating an RF carrier signal produced by said CMT transmitter with said up-link information signals.
      (ii) control circuitry means for converting received up-link data signals to CMT interface data signals of the same format as corresponding signals produced by said CMT handset, and for converting CMT handset control signals emitted by said CMT transceiver to a modulation signal for said down-link carrier signal, and
   b. a cordless handset/transceiver unit not connected by wires to said adapter means and including,
      i. a second, remote low power up-link transceiver including (A) an up-link transmitter of lower power output than that of said CMT transmitter and an operating frequency different from those of both said CMT transmitter and said CMT receiver, (B) means for modulating a carrier signal produced by said up-link transmitter with up-link information signals, (C) signal input port means operably connected to said modulation means, (D) a down-link receiver which receives a down-link carrier signal from said down-link transmitter means, (E) means for demodulating information signals on said down-link carrier, and (F) signal output port means connected to said demodulator means for reproducing said demodulated down-link signals, whereby information signals received by said CMT transceiver may be relayed through said signal output port means, and information signals inputted to said signal input port means of said cordless handset/-transceiver unit may be transmitted by said CMT transceiver.

2. The apparatus of claim 1 further including a speaker operably connected to said signal output port means of said cordless handset/transceiver unit.

3. The apparatus of claim 2 further including a microphone operably interconnected to said signal input port means of said cordless handset/transceiver unit.

4. The apparatus of claim 2 wherein said down-link carrier signal is further defined as being a radio frequency signal.

5. The apparatus of claim 4 wherein said up-link carrier signal is further defined as being a radio frequency signal.

6. The apparatus of claim 3 wherein said cordless handset/transceiver unit is further defined as including a keypad operably interconnected with said up-link modulator means and adapted to modulate said up-link RF carrier signal with up-link dialing data signals corresponding to a telephone number entered on said keypad.

7. The apparatus of claim 6 wherein said up-link data signal corresponding to a telephone number entered on said keypad is further defined as a sequence of DTMF tones.

8. The apparatus of claim 6 wherein said adapter unit is further defined as including means in combination with said down-link transceiver for tuning said receiver to a selected one of a plurality of frequency channels, means for scanning through said plurality of channels and locating a clear channel absent of signals above a pre-determined noise threshold, means for maintaining said receiver tuned to said clear channel, means for scanning the center frequency of said RF carrier of said down-link to a selected one of a plurality of frequency channels, and means for locking said down-link transmitter to a transmitter frequency channel having a center frequency spaced a pre-determined distance in frequency from said center frequency of said selected clear channel, said down-link transmitter and receiver frequency channels lying outside the frequency band of said CMT.

9. The apparatus of claim 8 wherein said handset/-transceiver is further defined as including means in combination with said cordless handset transceiver for performing receiver and transmitter frequency channel scanning and looking functions identical to those performed by said down-link transceiver.

10. The apparatus of claim 9 wherein said adapter unit is further defined as including means for modulating said down-link RP carrier with data signals.

11. The apparatus of claim 10 wherein said down-link data signals are further defined as including a coded signal that uniquely identifies said adapter unit.

12. The apparatus of claim 11 wherein said up-link data signals are further defined as including a coded data signal that uniquely identifies said cordless handset/transceiver.

13. The apparatus of claim 12 wherein said cordless handset/transceiver is further defined as including decoding means for comparing said identity code on said down-link carrier with said identity code of said cordless handset/transceiver and producing an enabling signal for enabling communication between said cordless handset/transceiver and said adapter unit if said codes match, and disabling communications if said codes do not match.

14. The apparatus of claim 13 wherein said adapter unit is further defined as including decoding means for comparing said identity code on said up-link carrier with said identity code of said adapter unit and producing an enabling signal for enabling communication between said adapter unit and said cordless handset/transceiver if said codes match, and disabling communications if said codes do not match.

* * * * *